US012683519B2

(12) United States Patent
Li et al.

(10) Patent No.: US 12,683,519 B2
(45) Date of Patent: Jul. 14, 2026

(54) PHOTOVOLTAIC INVERTER AND CONTROL METHOD THEREOF

(71) Applicant: Huawei Digital Power Technologies Co., Ltd., Shenzhen (CN)

(72) Inventors: Wenchao Li, Shanghai (CN); Mingxuan Dong, Shanghai (CN); Kai Xin, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/080,485

(22) Filed: Mar. 14, 2025

(65) Prior Publication Data

US 2025/0211132 A1      Jun. 26, 2025

Related U.S. Application Data

(63) Continuation of application No. PCT/CN2023/104301, filed on Jun. 29, 2023.

(30) Foreign Application Priority Data

Sep. 16, 2022    (CN) .......................... 202211131328.8

(51) Int. Cl.
| | |
|---|---|
| *H02M 7/487* | (2007.01) |
| *H02M 7/5387* | (2007.01) |
| *H02S 40/32* | (2014.01) |

(52) U.S. Cl.
CPC ....... *H02M 7/487* (2013.01); *H02M 7/53871* (2013.01); *H02S 40/32* (2014.12)

(58) Field of Classification Search
CPC ...... H02M 1/0025; H02M 1/08; H02M 1/088; H02M 1/12; H02M 7/48; H02M 7/487; H02M 7/4833; H02M 7/53871; H02S 40/32; Y02E 10/56
USPC .......................................................... 307/52
See application file for complete search history.

(56) References Cited

FOREIGN PATENT DOCUMENTS

| | | |
|---|---|---|
| CN | 108880308 A | 11/2018 |
| CN | 115498906 A | 12/2022 |
| JP | H09182455 A | 7/1997 |
| JP | 5952087 B2 | 7/2016 |
| JP | 2022060920 A | 4/2022 |
| WO | 2022051892 A1 | 3/2022 |

*Primary Examiner* — Hal Kaplan
(74) *Attorney, Agent, or Firm* — Conley Rose, P.C.

(57) ABSTRACT

A photovoltaic inverter includes a conversion circuit, a collection circuit, and a controller. The collection circuit is configured to obtain a positive direct current bus voltage and a negative direct current bus voltage of the conversion circuit. The controller is configured to generate an even-order harmonic voltage regulation signal based on the positive direct current bus voltage and the negative direct current bus voltage of the conversion circuit and a phase of an output voltage of the photovoltaic inverter, generate a drive control signal based on the even-order harmonic voltage regulation signal, and control a switching transistor in the conversion circuit to be turned on or off to control the conversion circuit to output a target voltage and reduce a difference between the positive direct current bus voltage and the negative direct current bus voltage of the conversion circuit.

20 Claims, 8 Drawing Sheets

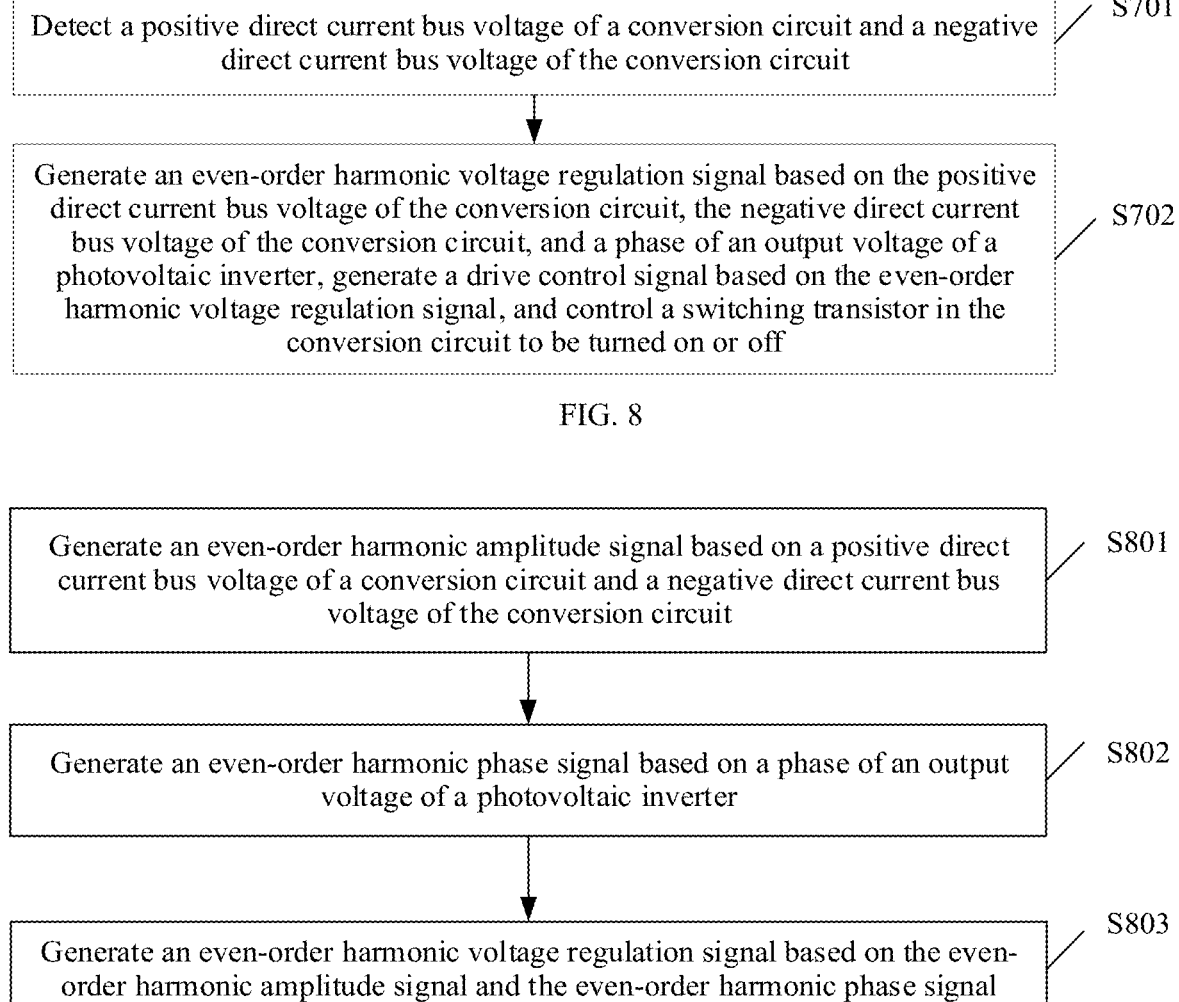

Detect a positive direct current bus voltage of a conversion circuit and a negative direct current bus voltage of the conversion circuit — S701

Generate an even-order harmonic voltage regulation signal based on the positive direct current bus voltage of the conversion circuit, the negative direct current bus voltage of the conversion circuit, and a phase of an output voltage of a photovoltaic inverter, generate a drive control signal based on the even-order harmonic voltage regulation signal, and control a switching transistor in the conversion circuit to be turned on or off — S702

FIG. 8

Generate an even-order harmonic amplitude signal based on a positive direct current bus voltage of a conversion circuit and a negative direct current bus voltage of the conversion circuit — S801

Generate an even-order harmonic phase signal based on a phase of an output voltage of a photovoltaic inverter — S802

Generate an even-order harmonic voltage regulation signal based on the even-order harmonic amplitude signal and the even-order harmonic phase signal — S803

FIG. 9

PHOTOVOLTAIC INVERTER AND CONTROL METHOD THEREOF

CROSS-REFERENCE TO RELATED APPLICATIONS

This is a continuation of International Patent Application No. PCT/CN2023/104301 filed on Jun. 29, 2023, which claims priority to Chinese Patent Application No. 202211131328.8 filed on Sep. 16, 2022, which are hereby incorporated by reference in their entireties.

TECHNICAL FIELD

This disclosure relates to the field of power electronics technologies, and in particular, to a photovoltaic inverter and a control method thereof.

BACKGROUND

In the field of power electronics technologies, a conversion circuit in an inverter converts direct current electric energy of a power supply into alternating current electric energy and provides the alternating current electric energy for a load. The conversion circuit (for example, a neutral point clamped (NPC) inverter circuit) is widely used due to advantages such as high security, high efficiency, a low loss, and a small harmonic. FIG. 1A and FIG. 1B are a schematic of structures of two NPC inverter circuits according to this disclosure. As shown in FIG. 1A and in FIG. 1B, NPC inverter circuits (namely, a conversion circuits) includes two capacitors connected in series and three switching bridge arms, a series connection point of the two capacitors is a neutral point of the conversion circuit, and each switching bridge arm includes four switching transistors and two clamp diodes. In an ideal state, in a power supply cycle of the conversion circuit, a quantity of charges flowing into the neutral point of the conversion circuit and a quantity of charges flowing out of the neutral point of the conversion circuit are the same. In other words, voltages of the two capacitors connected in series in the conversion circuit are equal. However, in actual application, because working states of switching transistors in the switching bridge arms of the conversion circuit are usually asymmetric (for example, different switching transistor models, different losses, asymmetrical loads, or being affected by factors such as a switching deadband), in the power supply cycle, the quantity of charges flowing into the neutral point of the conversion circuit and the quantity of charges flowing out of the neutral point of the conversion circuit are different. In other words, amounts of charged energy (or amounts of discharged energy) of the two capacitors connected in series in the conversion circuit are not equal. Consequently, the voltages of the two capacitors connected in series in the conversion circuit are not equal (that is, a positive direct current bus voltage and a negative direct current bus voltage of the conversion circuit are not equal, or a voltage at the neutral point of the conversion circuit is unbalanced). As a result, an output voltage (or an output current) of the conversion circuit is distorted, and even a power component in a system is damaged.

Furthermore, a method for adjusting a voltage at a neutral point by calculating and adjusting a redundant small vector based on a direct current bus voltage difference is complicated, a calculation process is complex, costs are high, and control is complex, and a method for balancing a voltage at a neutral point by injecting a zero-sequence voltage into a modulated wave imposes many restrictions on an algorithm and a load type of the modulated wave of a conversion circuit. For example, when a discontinuous pulse-width modulation (DPWM) wave is used, space for injecting the zero sequence into the modulated wave is limited. Consequently, this method for modulating the voltage at the neutral point has poor adaptability, a poor adjustment capability, and poor control effect.

SUMMARY

This disclosure provides a photovoltaic inverter and a control method thereof, to improve stability of a voltage at a neutral point of a conversion circuit by adjusting turn-on time or turn-off time of a switching transistor in the conversion circuit. In this way, a structure is simple, a control method is easy, and applicability is high.

According to a first aspect, this disclosure provides a photovoltaic inverter. The photovoltaic inverter is applicable to a power supply system, and the photovoltaic inverter includes a conversion circuit, a collection circuit, and a controller. Herein, an input of the conversion circuit may be connected to a power supply through a positive direct current bus and a negative direct current bus, and an output of the conversion circuit may be configured to connect to a load. The collection circuit herein may obtain a positive direct current bus voltage of the conversion circuit and a negative direct current bus voltage of the conversion circuit. The controller herein may generate an even-order harmonic voltage regulation signal based on the positive direct current bus voltage of the conversion circuit, the negative direct current bus voltage of the conversion circuit, and a phase of an output voltage of the photovoltaic inverter, generate a drive control signal based on the even-order harmonic voltage regulation signal, and control a switching transistor in the conversion circuit to be turned on or off, to control the conversion circuit to output a target voltage and reduce a difference between the positive direct current bus voltage and the negative direct current bus voltage of the conversion circuit.

In this disclosure, the power supply may be connected to the conversion circuit through the positive direct current bus and the negative direct current bus, and the conversion circuit may convert direct current electric energy provided by the power supply into alternating current electric energy and provide the alternating current electric energy for the load. In a power supply process, the conversion circuit may separately charge and discharge a capacitor in the conversion circuit by turning on and off different switching transistors, to convert the direct current electric energy provided by the power supply into the alternating current electric energy and transmit the alternating current electric energy to the load. It may be understood that, when output voltages (or output currents) of the photovoltaic inverter are asymmetric (for example, different switching transistor models, different losses, asymmetric loads, or affected by factors such as a switching deadband), in a power supply cycle, the positive direct current bus voltage and the negative direct current bus voltage of the conversion circuit are not equal, or in other words, there is a difference between the positive direct current bus voltage and the negative direct current bus voltage of the conversion circuit. Consequently, an output voltage (or an output current) of the conversion circuit is distorted and, even a power component in a system is damaged.

In this disclosure, the collection circuit may obtain the positive direct current bus voltage and the negative direct current bus voltage of the conversion circuit. The controller may generate the even-order harmonic voltage regulation signal based on the positive direct current bus voltage and the negative direct current bus voltage of the conversion circuit and the phase of the output voltage of the photovoltaic inverter, further generate the drive control signal (for example, a drive control signal such as a pulse-width modulation (PWM) wave) based on the even-order harmonic voltage regulation signal, and control the switching transistor in the conversion circuit to be turned on or off. Herein, the drive control signal generated based on the even-order harmonic voltage regulation signal may be used to control the conversion circuit to output an output voltage including an even-order harmonic, an output current including an even-order harmonic component is generated after the even-order harmonic in the output voltage passes through the load, the even-order harmonic component in the output current may interact with a fundamental component in the drive control signal, and/or an even-order harmonic component in the drive control signal may interact with the fundamental component in the output current, to reduce the difference between the positive direct current bus voltage and the negative direct current bus voltage. It may be understood that the photovoltaic inverter provided in this disclosure may be applicable to a conversion circuit that uses a DPWM wave as a drive control signal, and may also be applicable to a conversion circuit that uses, as a drive control signal, another PWM wave (for example, a sine pulse width modulation (SPWM) wave, a third harmonic injection pulse-width modulation (THIPWM) wave, or a carrier based space vector pulse width modulation (CBSVPWM) wave). Therefore, the photovoltaic inverter is applicable to a wide range of scenarios and has good control effect.

According to this disclosure, the photovoltaic inverter can reduce the difference between the positive direct current bus voltage and the negative direct current bus voltage of the conversion circuit while controlling the conversion circuit to output the target voltage, to improve stability of a voltage at a neutral point of the conversion circuit. In this way, a structure is simple, a control method is easy, and applicability is high.

With reference to the first aspect, in a first possible implementation, the conversion circuit may include two groups of capacitors and at least one switching bridge arm, one of the switching bridge arm includes a plurality of switching transistors, the two groups of capacitors are connected in series and then connected in parallel with the at least one switching bridge arm between the positive direct current bus and the negative direct current bus of the conversion circuit, a series connection point of the two groups of capacitors is a neutral point of the conversion circuit, and an input of the collection circuit is connected to the positive direct current bus, the negative direct current bus, and the neutral point of the conversion circuit. The collection circuit herein may further obtain the positive direct current bus voltage and the negative direct current bus voltage of the conversion circuit based on a potential of the positive direct current bus, a potential of the negative direct current bus, and a potential of the neutral point of the conversion circuit. In this way, a connection manner is simple, a detection method is easy, and detection efficiency is high.

With reference to the first aspect or the first possible implementation of the first aspect, in a second possible implementation, the controller may be further configured to generate an even-order harmonic amplitude signal based on the positive direct current bus voltage and the negative direct current bus voltage, generate an even-order harmonic phase signal based on the phase of the output voltage, and generate the even-order harmonic voltage regulation signal based on the even-order harmonic amplitude signal and the even-order harmonic phase signal.

According to this disclosure, the controller may obtain a voltage difference at the neutral point of the conversion circuit based on the positive direct current bus voltage and the negative direct current bus voltage of the conversion circuit, and generate the even-order harmonic amplitude signal based on the voltage difference at the neutral point of the conversion circuit. The controller may further generate a corresponding even-order harmonic phase signal by performing frequency multiplication based on the phase of the output voltage of the photovoltaic inverter. It may be understood that the controller may generate the even-order harmonic voltage regulation signal based on the even-order harmonic amplitude signal and the even-order harmonic phase signal, further generate the drive control signal based on the even-order harmonic voltage regulation signal, and control, based on the drive control signal, the switching transistor in the conversion circuit to be turned on or off. It may be further understood that the even-order harmonic voltage regulation signal herein may be an even-order harmonic voltage regulation signal generated based on one type of even-order harmonic (for example, a second-order harmonic), or may be an even-order harmonic voltage regulation signal generated by superimposing a plurality of types of even-order harmonics (for example, a second-order harmonic and a fourth-order harmonic).

According to this disclosure, the photovoltaic inverter may determine an amplitude of the even-order harmonic voltage regulation signal based on the positive direct current bus voltage and the negative direct current bus voltage of the conversion circuit, determine a phase of the even-order harmonic voltage regulation signal based on the phase of the output voltage of the photovoltaic inverter, and further generate the drive control signal based on the even-order harmonic voltage regulation signal. The photovoltaic inverter reduces the difference between the positive direct current bus voltage and the negative direct current bus voltage of the conversion circuit while controlling the conversion circuit to output the target voltage, to improve the stability of the voltage at the neutral point of the conversion circuit. In this way, a structure is simple, a control method is accurate and easy, and applicability is high.

With reference to the second possible implementation of the first aspect, in a third possible implementation, the collection circuit may be further configured to obtain the phase of the output voltage of the photovoltaic inverter and a phase of an output current of the photovoltaic inverter. The collection circuit may further determine a type of the load based on the phase of the output voltage of the photovoltaic inverter and the phase of the output current of the photovoltaic inverter, and generate the even-order harmonic phase signal based on the phase of the output voltage of the photovoltaic inverter and the type of the load. Herein, the type of the load is one or more of an inductive load, a capacitive load, and/or a resistive load. It may be understood that the photovoltaic inverter may obtain the phase of the output voltage of the photovoltaic inverter and the phase of the output current of the photovoltaic inverter through the collection circuit, and further determine the type of the load based on the phase of the output voltage of the photovoltaic inverter and the phase of the output current of the photovoltaic inverter. Herein, for different types of loads, different phases have different adjustment effects. In an example, for different types of loads, the photovoltaic inverter may correspondingly generate a first phase for the resistive load, correspondingly generate a second phase for the capacitive load, and correspondingly generate a third phase for the inductive load. Alternatively, the photovoltaic inverter may generate a fourth phase for a plurality of types of mixed loads. Alternatively, the photovoltaic inverter may superimpose a first phase, a second phase, or a third phase for a plurality of types of mixed loads based on weights, to generate a new phase (for example, a fifth phase), and superimpose the first phase, the second phase, the third phase, the fourth phase, or the fifth phase with the phase that is of the output voltage of the photovoltaic inverter and based on which frequency multiplication is performed, to generate the even-order harmonic phase signal. Further, it may be understood that the photovoltaic inverter herein may alternatively determine output power (including active power and reactive power) of the photovoltaic inverter based on the output voltage and the output current of the photovoltaic inverter, and determine the type of the load based on symbols of the active power and the reactive power of the photovoltaic inverter. Alternatively, the photovoltaic inverter may determine a power factor of the conversion circuit based on the output voltage and the output current of the photovoltaic inverter, and determine the type of the load based on the power factor of the conversion circuit. This may be determined based on an application scenario. Herein, the photovoltaic inverter may generate the even-order harmonic voltage regulation signal based on the even-order harmonic amplitude signal and the even-order harmonic phase signal. The even-order harmonic voltage regulation signal herein may be an even-order harmonic voltage regulation signal generated based on one type of even-order harmonic (for example, a second-order harmonic), or may be an even-order harmonic voltage regulation signal generated by superimposing a plurality of types of even-order harmonics (for example, a second-order harmonic and a fourth-order harmonic). Further, it may be further understood that the photovoltaic inverter herein may generate a plurality of even-order harmonic phase signals with different phases for a plurality of types of mixed loads, generate a plurality of even-order harmonic voltage regulation signals based on the plurality of even-order harmonic phase signals and the even-order harmonic amplitude signal, and superimpose the plurality of even-order harmonic voltage regulation signals based on weights to obtain an even-order harmonic voltage regulation signal.

According to this disclosure, the photovoltaic inverter may determine the type of the load based on the phase of the output voltage and the phase of the output current of the photovoltaic inverter, determine the phase of the even-order harmonic voltage regulation signal based on the phase of the output voltage of the photovoltaic inverter and the type of the load, and then generate the drive control signal based on the even-order harmonic voltage regulation signal. In an example, the photovoltaic inverter may generate targeted drive control signals based on different types of loads, to reduce the difference between the positive direct current bus voltage and the negative direct current bus voltage of the conversion circuit while controlling the conversion circuit to output the target voltage, thereby improving the stability of the voltage at the neutral point of the conversion circuit. In this way, a structure is simple, a control method is easy, applicability is high, and control efficiency is high.

With reference to the third possible implementation of the first aspect, in a fourth possible implementation, the controller may include a signal generation unit, a voltage control unit, and a drive control unit, the signal generation unit may be connected to the collection circuit and the voltage control unit, and the voltage control unit is connected to the conversion circuit through the drive control unit. The signal generation unit herein may generate the even-order harmonic amplitude signal based on the positive direct current bus voltage and the negative direct current bus voltage, generate the even-order harmonic phase signal based on the phase of the output voltage of the photovoltaic inverter, and generate the even-order harmonic voltage regulation signal based on the even-order harmonic amplitude signal and the even-order harmonic phase signal. The voltage control unit herein may generate a voltage instruction signal of the conversion circuit based on the even-order harmonic voltage regulation signal. The drive control unit herein may generate the drive control signal based on the voltage instruction signal of the conversion circuit, and control, based on the drive control signal, the switching transistor in the conversion circuit to be turned on or off. It may be understood that the photovoltaic inverter herein may generate the voltage instruction signal of the conversion circuit based on the even-order harmonic voltage regulation signal, and then the photovoltaic inverter may generate the drive control signal based on the voltage instruction signal, and control, based on the drive control signal, the switching transistor in the conversion circuit to be turned on or off, so that not only the conversion circuit outputs the target voltage, but also the voltage at the neutral point of the conversion circuit remains stable. In this way, a structure is simple, and a control method is easy.

With reference to the fourth possible implementation of the first aspect, in a fifth possible implementation, the voltage control unit may be further configured to obtain a fundamental wave instruction of an external central control system. The voltage control unit herein may be further configured to superimpose the fundamental wave instruction and the even-order harmonic voltage regulation signal to obtain the voltage instruction signal of the conversion circuit. It may be understood that the photovoltaic inverter herein may obtain the fundamental wave instruction sent by the external central control system, directly obtain a fundamental wave signal based on the fundamental wave instruction or obtain a fundamental wave signal through calculation, and superpose and modulate the fundamental wave signal and the even-order harmonic voltage regulation signal, to obtain the voltage instruction signal of the conversion circuit, and further, the drive control unit may generate the drive control signal based on the voltage instruction signal, and control, based on the drive control signal, the switching transistor in the conversion circuit to be turned on or off. In this way, a structure is simple, a control method is easy, and control efficiency is high.

With reference to the fifth possible implementation of the first aspect, in a sixth possible implementation, the controller may further include a voltage feedback unit, and the voltage feedback unit may be connected to the collection circuit and the voltage control unit. The voltage feedback unit herein may be configured to obtain the output voltage of the photovoltaic inverter through the collection circuit, and use the output voltage of the photovoltaic inverter as a voltage feedback signal. The voltage control unit herein may further generate a level-1 voltage instruction signal based on the voltage feedback signal and the voltage instruction signal of the conversion circuit. The drive control unit herein may further generate the drive control signal based on the level-1 voltage instruction signal. It may be understood that the voltage control unit herein may be a voltage control loop, and the voltage feedback unit herein may obtain the output voltage of the photovoltaic inverter, and input the output voltage of the photovoltaic inverter to the voltage control unit as the voltage feedback signal, so that the voltage control unit may further adjust the voltage instruction signal by comparing the voltage instruction signal with the voltage feedback signal, to generate the level-1 voltage instruction signal (that is, a voltage instruction signal adjusted based on the voltage feedback signal). Further, the drive control unit may further generate the drive control signal based on the level-1 voltage instruction signal, and control, based on the drive control signal, the switching transistor in the conversion circuit to be turned on or off.

According to this disclosure, not only the conversion circuit outputs the target voltage, but also the voltage at the neutral point of the conversion circuit remains stable. In this way, a structure is simple, and a control method is easy. In addition, the photovoltaic inverter may adjust the drive control signal in real time by using the output voltage of the photovoltaic inverter as the voltage feedback signal. Therefore, control efficiency is high.

With reference to the sixth possible implementation of the first aspect, in a seventh possible implementation, the controller may further include a current control unit and a current feedback unit, the current control unit may be connected to the voltage control unit and the drive control unit, and the current feedback unit may be connected to the collection circuit and the current control unit. The current feedback unit herein may be configured to obtain the output current of the photovoltaic inverter through the collection circuit, and use the output current of the photovoltaic inverter as a current feedback signal. The current control unit herein may generate a level-2 voltage instruction signal based on the level-1 voltage instruction signal output by the voltage control unit and the current feedback signal. The drive control unit herein may further generate the drive control signal based on the level-2 voltage instruction signal. It may be understood that the current control unit herein may be a current control loop, and the current feedback unit herein may obtain the output current of the photovoltaic inverter, and input the output current of the photovoltaic inverter to the current control unit as the current feedback signal, so that the current control unit may further adjust the level-1 voltage instruction signal output by the voltage control unit by comparing the level-1 voltage instruction signal with the current feedback signal, to generate the level-2 voltage instruction signal (that is, a voltage instruction signal obtained by adjusting based on the voltage feedback signal and the current feedback signal). Herein, the drive control unit may further generate the drive control signal based on the level-2 voltage instruction signal, and control, based on the drive control signal, the switching transistor in the conversion circuit to be turned on or off.

According to this disclosure, not only the conversion circuit outputs the target voltage, but also the voltage at the neutral point of the conversion circuit remains stable. In this way, a structure is simple, and a control method is easy. In addition, the photovoltaic inverter may adjust the drive control signal in real time by using the output current of the photovoltaic inverter as a feedback signal. Therefore, control efficiency is high.

With reference to the seventh possible implementation of the first aspect, in an eighth possible implementation, the drive control unit may be further connected to the signal generation unit. The drive control unit herein may be further configured to obtain the even-order harmonic voltage regulation signal of the signal generation unit, and generate the drive control signal based on the even-order harmonic voltage regulation signal and the level-2 voltage instruction signal. Herein, the drive control unit may alternatively obtain the even-order harmonic voltage regulation signal of the signal generation unit and the fundamental wave signal generated based on the fundamental wave instruction of the external central control system (or may directly obtain a signal obtained by superimposing the even-order harmonic voltage regulation signal and the fundamental wave signal), and generate the drive control signal based on the even-order harmonic voltage regulation signal, the fundamental wave signal, and the level-2 voltage instruction signal. It may be understood that the drive control unit herein may be a generation circuit of a PWM wave or a generation circuit of another type of modulation signal, or may be a generation circuit of a PWM wave or a combination circuit of a generation circuit of another type of modulation signal and a switching transistor drive circuit, the drive control unit herein may obtain the even-order harmonic voltage regulation signal output by the signal generation unit, and then, the drive control unit may generate the drive control signal based on the even-order harmonic voltage regulation signal and the level-2 voltage instruction signal. Herein, when the photovoltaic inverter does not include the current control unit and the current feedback unit, the drive control unit may alternatively generate the drive control signal based on the even-order harmonic voltage regulation signal and the level-1 voltage instruction signal.

According to this disclosure, not only the conversion circuit outputs the target voltage, but also the voltage at the neutral point of the conversion circuit remains stable. In this way, a structure is simple, and a control method is easy. In addition, the drive control unit may further generate the drive control signal based on the even-order harmonic voltage regulation signal and the level-2 voltage instruction signal. This is equivalent to injecting an even-order harmonic component to the drive control signal, to further maintain a neutral point balance of the conversion circuit. Therefore, control efficiency is high.

According to a second aspect, this disclosure provides a power supply system. The power supply system may include a power supply and the photovoltaic inverter in any one of the first aspect or the possible implementations of the first aspect.

According to this disclosure, not only the photovoltaic inverter outputs a target voltage, but also the power supply system can reduce a difference between a positive direct current bus voltage and a negative direct current bus voltage of a conversion circuit in the photovoltaic inverter, to improve stability of a voltage at a neutral point of the conversion circuit. In this way, a structure is simple, a control method is easy, and applicability is high.

According to a third aspect, this disclosure provides a photovoltaic inverter control method. The control method is applicable to a photovoltaic inverter. The photovoltaic inverter includes a conversion circuit and positive and negative direct current buses. One end of the positive and negative direct current buses is connected to the conversion circuit, and the other end of the positive and negative direct current buses is configured to connect to a power supply. The method includes detecting a positive direct current bus voltage of the conversion circuit and a negative direct current bus voltage of the conversion circuit, and generating an even-order harmonic voltage regulation signal based on the positive direct current bus voltage of the conversion circuit, the negative direct current bus voltage of the conversion circuit, and a phase of an output voltage of the photovoltaic inverter, generating a drive control signal based on the even-order harmonic voltage regulation signal, and controlling a switching transistor in the conversion circuit to be turned on or off, to control the conversion circuit to output a target voltage and reduce a difference between the positive direct current bus voltage and the negative direct current bus voltage of the conversion circuit.

In this disclosure, the photovoltaic inverter may generate the even-order harmonic voltage regulation signal based on the positive direct current bus voltage and the negative direct current bus voltage of the conversion circuit and the phase of the output voltage of the photovoltaic inverter. Further, the photovoltaic inverter may generate a drive control signal based on the even-order harmonic voltage regulation signal, and control, based on the drive control signal, the switching transistor in the conversion circuit to be turned on or off. Herein, the drive control signal generated based on the even-order harmonic voltage regulation signal may control the conversion circuit to output an output voltage including an even-order harmonic, an output current including an even-order harmonic component is generated after the even-order harmonic in the output voltage passes through a load, the even-order harmonic component in the output current may interact with a fundamental component in the drive control signal, and/or an even-order harmonic component in the drive control signal may interact with a fundamental component in the output current, to reduce the difference between the positive direct current bus voltage and the negative direct current bus voltage of the conversion circuit.

According to this disclosure, the photovoltaic inverter can reduce the difference between the positive direct current bus voltage and the negative direct current bus voltage of the conversion circuit while controlling the conversion circuit to output the target voltage, to improve stability of a voltage at a neutral point of the conversion circuit. In this way, a structure is simple, a control method is easy, and applicability is high.

With reference to the third aspect, in a first possible implementation, the conversion circuit may include two groups of capacitors and at least one switching bridge arm, and detecting a positive direct current bus voltage of the conversion circuit and a negative direct current bus voltage of the conversion circuit includes detecting the positive direct current bus voltage and the negative direct current bus voltage of the conversion circuit based on a potential of the positive direct current bus, a potential of the negative direct current bus, and a potential of a neutral point of the conversion circuit. In this way, a connection manner is simple, a detection method is easy, and detection efficiency is high.

With reference to the third aspect or the first possible implementation of the third aspect, in a second possible implementation, generating an even-order harmonic voltage regulation signal based on the positive direct current bus voltage of the conversion circuit, the negative direct current bus voltage of the conversion circuit, and an output voltage of the photovoltaic inverter may include generating an even-order harmonic amplitude signal based on the positive direct current bus voltage and the negative direct current bus voltage of the conversion circuit, generating an even-order harmonic phase signal based on the phase of the output voltage of the photovoltaic inverter, and generating the even-order harmonic voltage regulation signal based on the even-order harmonic amplitude signal and the even-order harmonic phase signal.

According to this disclosure, the photovoltaic inverter may detect the positive direct current bus voltage and the negative direct current bus voltage of the conversion circuit, to obtain a voltage difference at the neutral point of the conversion circuit, and generate the even-order harmonic amplitude signal based on the voltage difference at the neutral point of the conversion circuit. In addition, the photovoltaic inverter may detect the phase of the output voltage of the photovoltaic inverter, and further generate a corresponding even-order harmonic phase signal by performing frequency multiplication based on the phase of the output voltage of the photovoltaic inverter. It may be understood that the photovoltaic inverter may generate the even-order harmonic voltage regulation signal based on the even-order harmonic amplitude signal and the even-order harmonic phase signal, further generate the drive control signal (for example, a drive control signal such as a PWM wave) based on the even-order harmonic voltage regulation signal, and control, based on the drive control signal, the switching transistor in the conversion circuit to be turned on or off. It may be further understood that the even-order harmonic voltage regulation signal herein may be an even-order harmonic voltage regulation signal generated based on one type of even-order harmonic (for example, a second-order harmonic), or may be an even-order harmonic voltage regulation signal generated by superimposing a plurality of types of even-order harmonics (for example, a second-order harmonic and a fourth-order harmonic).

According to this disclosure, the photovoltaic inverter may determine an amplitude of the even-order harmonic voltage regulation signal based on the positive direct current bus voltage and the negative direct current bus voltage of the conversion circuit, determine a phase of the even-order harmonic voltage regulation signal based on the phase of the output voltage of the photovoltaic inverter, and further generate the drive control signal based on the even-order harmonic voltage regulation signal. The photovoltaic inverter reduces the difference between the positive direct current bus voltage and the negative direct current bus voltage of the conversion circuit while controlling the conversion circuit to output the target voltage, to improve the stability of the voltage at the neutral point of the conversion circuit. In this way, a structure is simple, a control method is accurate and easy, and applicability is high.

With reference to the second possible implementation of the third aspect, in a third possible implementation, generating an even-order harmonic phase signal based on the phase of the output voltage of the photovoltaic inverter may include detecting the phase of the output voltage of the photovoltaic inverter and a phase of an output current of the photovoltaic inverter, and determining a type of a load based on the phase of the output voltage of the photovoltaic inverter and the phase of the output current of the photovoltaic inverter, and generating the even-order harmonic phase signal based on the phase of the output voltage of the photovoltaic inverter and the type of the load, where the type of the load is one or more of an inductive load, a capacitive load, and/or a resistive load. It may be understood that the photovoltaic inverter may detect the phase of the output voltage of the photovoltaic inverter and the phase of the output current of the photovoltaic inverter through the collection circuit, and further determine the type of the load based on the phase of the output voltage of the photovoltaic inverter and the phase of the output current of the photovoltaic inverter. Herein, for different types of loads, different phases have different adjustment effects. In an example, for different types of loads, the photovoltaic inverter may correspondingly generate a first phase for the resistive load, correspondingly generate a second phase for the capacitive load, and correspondingly generate a third phase for the inductive load. Alternatively, the photovoltaic inverter may generate a fourth phase for a plurality of types of mixed loads. Alternatively, the photovoltaic inverter may superimpose a first phase, a second phase, or a third phase for a plurality of types of mixed loads based on weights, to generate a new phase (for example, a fifth phase), and superimpose the first phase, the second phase, the third phase, the fourth phase, or the fifth phase with the phase that is of the output voltage of the photovoltaic inverter and based on which frequency multiplication is performed, to generate the even-order harmonic phase signal. Further, it may be understood that the photovoltaic inverter herein may alternatively determine output power (including active power and reactive power) of the photovoltaic inverter based on the output voltage and the output current of the photovoltaic inverter, and determine the type of the load based on symbols of the active power and the reactive power of the conversion circuit. Alternatively, the photovoltaic inverter may determine a power factor of the conversion circuit based on the output voltage and the output current of the photovoltaic inverter, and determine the type of the load based on the power factor of the conversion circuit. This may be further determined based on an application scenario. Herein, the photovoltaic inverter may generate the even-order harmonic voltage regulation signal based on the even-order harmonic amplitude signal and the even-order harmonic phase signal. The even-order harmonic voltage regulation signal herein may be an even-order harmonic voltage regulation signal generated based on one type of even-order harmonic (for example, a second-order harmonic), or may be an even-order harmonic voltage regulation signal generated by superimposing a plurality of types of even-order harmonics (for example, a second-order harmonic and a fourth-order harmonic).

According to this disclosure, the photovoltaic inverter may determine the type of the load based on the phase of the output voltage and the phase of the output current of the photovoltaic inverter, determine the phase of the even-order harmonic voltage regulation signal based on the phase of the output voltage of the photovoltaic inverter and the type of the load, and then generate the drive control signal based on the even-order harmonic voltage regulation signal. In an example, the photovoltaic inverter may generate targeted drive control signals based on different types of loads, to reduce the difference between the positive direct current bus voltage and the negative direct current bus voltage of the conversion circuit while controlling the conversion circuit to output the target voltage, thereby improving the stability of the voltage at the neutral point of the conversion circuit. In this way, a structure is simple, a control method is easy, applicability is high, and control efficiency is high.

With reference to the third possible implementation of the third aspect, in a fourth possible implementation, generating a drive control signal based on the even-order harmonic voltage regulation signal may include generating a voltage instruction signal of the conversion circuit based on the even-order harmonic voltage regulation signal, and generating the drive control signal based on the voltage instruction signal of the conversion circuit. It may be understood that the photovoltaic inverter herein may generate the voltage instruction signal of the conversion circuit based on the even-order harmonic voltage regulation signal, and then the photovoltaic inverter may generate the drive control signal based on the voltage instruction signal, and control, based on the drive control signal, the switching transistor in the conversion circuit to be turned on or off, so that not only the conversion circuit outputs the target voltage, but also the voltage at the neutral point of the conversion circuit remains stable. In this way, a structure is simple, and a control method is easy.

With reference to the fourth possible implementation of the third aspect, in a fifth possible implementation, generating a voltage instruction signal of the conversion circuit based on the even-order harmonic voltage regulation signal may include detecting a fundamental wave instruction of an external central control system, and superposing the fundamental wave instruction and the even-order harmonic voltage regulation signal to obtain the voltage instruction signal of the conversion circuit. It may be understood that the photovoltaic inverter herein may detect the fundamental wave instruction sent by the external central control system, directly obtain a fundamental wave signal based on the fundamental wave instruction or obtain a fundamental wave signal through calculation, and superpose and modulate the fundamental wave signal and the even-order harmonic voltage regulation signal, to obtain the voltage instruction signal of the conversion circuit, and further, the photovoltaic inverter may generate the drive control signal based on the voltage instruction signal, and control, based on the drive control signal, the switching transistor in the conversion circuit to be turned on or off. In this way, a structure is simple, a control method is easy, and control efficiency is high.

With reference to the fifth possible implementation of the third aspect, in a sixth possible implementation, after generating a voltage instruction signal of the conversion circuit based on the even-order harmonic voltage regulation signal, the method may further include detecting the output voltage of the photovoltaic inverter, and using the output voltage of the photovoltaic inverter as a voltage feedback signal, generating a level-1 voltage instruction signal based on the voltage feedback signal and the voltage instruction signal of the conversion circuit, and generating the drive control signal based on the level-1 voltage instruction signal. It may be understood that the photovoltaic inverter herein may detect the output voltage of the photovoltaic inverter, and use the output voltage of the photovoltaic inverter as the voltage feedback signal, so that the photovoltaic inverter may adjust the voltage instruction signal by comparing the voltage instruction signal with the voltage feedback signal, and generate the level-1 voltage instruction signal (that is, a voltage instruction signal adjusted based on the voltage feedback signal). Further, the photovoltaic inverter may further generate the drive control signal based on the level-1 voltage instruction signal, and control, based on the drive control signal, the switching transistor in the conversion circuit to be turned on or off.

According to this disclosure, not only the conversion circuit outputs the target voltage, but also the voltage at the neutral point of the conversion circuit remains stable. In this way, a structure is simple, and a control method is easy. In addition, the photovoltaic inverter may adjust the drive control signal in real time by using the output voltage of the photovoltaic inverter as the voltage feedback signal. Therefore, control efficiency is high.

With reference to the sixth possible implementation of the third aspect, in a seventh possible implementation, after generating a level-1 voltage instruction signal based on the voltage feedback signal and the voltage instruction signal of the conversion circuit, the method may further include detecting the output current of the photovoltaic inverter, and using the output current of the photovoltaic inverter as a current feedback signal, generating a level-2 voltage instruction signal based on the level-1 voltage instruction signal and the current feedback signal, and generating the drive control signal based on the level-2 voltage instruction signal. It may be understood that the photovoltaic inverter herein may detect the output current of the photovoltaic inverter, and use the output current of the photovoltaic inverter as the current feedback signal, so that the photovoltaic inverter may adjust the level-1 voltage instruction signal by comparing the level-1 voltage instruction signal with the current feedback signal, and generate the level-2 voltage instruction signal (that is, a voltage instruction signal adjusted based on the voltage feedback signal and the current feedback signal). Herein, the photovoltaic inverter may further generate the drive control signal based on the level-2 voltage instruction signal, and control, based on the drive control signal, the switching transistor in the conversion circuit to be turned on or off.

According to this disclosure, not only the conversion circuit outputs the target voltage, but also the voltage at the neutral point of the conversion circuit remains stable. In this way, a structure is simple, and a control method is easy. In addition, the photovoltaic inverter may adjust the drive control signal in real time by using the output current of the photovoltaic inverter as the current feedback signal. Therefore, control efficiency is high.

With reference to the seventh possible implementation of the third aspect, in an eighth possible implementation, after generating a level-2 voltage instruction signal based on the level-1 voltage instruction signal and the current feedback signal, the method may further include detecting the even-order harmonic voltage regulation signal, and generating the drive control signal based on the even-order harmonic voltage regulation signal and the level-2 voltage instruction signal. Herein, the photovoltaic inverter may also detect the even-order harmonic voltage regulation signal and a fundamental wave signal generated based on the fundamental wave instruction of the external central control system (or may directly detect a signal obtained by superimposing the even-order harmonic voltage regulation signal and a fundamental wave signal), and generate the drive control signal based on the even-order harmonic voltage regulation signal, the fundamental wave signal, and the level-2 voltage instruction signal. It may be understood that the photovoltaic inverter may generate the drive control signal based on the even-order harmonic voltage regulation signal and the level-2 voltage instruction signal. Herein, when there is no current control unit in the photovoltaic inverter, the photovoltaic inverter may alternatively generate the drive control signal based on the even-order harmonic voltage regulation signal and the level-1 voltage instruction signal.

According to this disclosure, not only the conversion circuit outputs the target voltage, but also the voltage at the neutral point of the conversion circuit remains stable. In this way, a structure is simple, and a control method is easy. In addition, the photovoltaic inverter may further generate the drive control signal based on the even-order harmonic voltage regulation signal and the level-2 voltage instruction signal. This is equivalent to injecting an even-order harmonic component to the drive control signal, to further maintain a neutral point balance of the conversion circuit. Therefore, control efficiency is high.

BRIEF DESCRIPTION OF DRAWINGS

FIG. 8 is a schematic flowchart of a control method according to an embodiment of this disclosure; and FIG. 9 is another schematic flowchart of a control method according to an embodiment of this disclosure.

DESCRIPTION OF EMBODIMENTS

A photovoltaic inverter provided in this disclosure is applicable to a plurality of application fields such as the new energy power generation field, the power generation peak and frequency regulation field, the important device power supply field, and the new energy vehicle field. This may be determined based on an actual application scenario, and is not limited herein. The photovoltaic inverter provided in this disclosure is applicable to different power supply systems such as an energy storage system, an uninterruptible power supply system, and a motor drive system. This may be determined based on an actual application scenario, and is not limited herein. The photovoltaic inverter provided in this disclosure may be adapted to different application scenarios, for example, an application scenario in which a conversion circuit in a solar energy power supply environment is controlled, an application scenario in which a conversion circuit in a wind energy power supply environment is controlled, an application scenario in which a conversion circuit in a pure energy storage power supply environment is controlled, or another application scenario. The following uses the application scenario in which the conversion circuit in the pure energy storage power supply environment is controlled as an example for description. Details are not described below again.

Figures 1A, 1B:
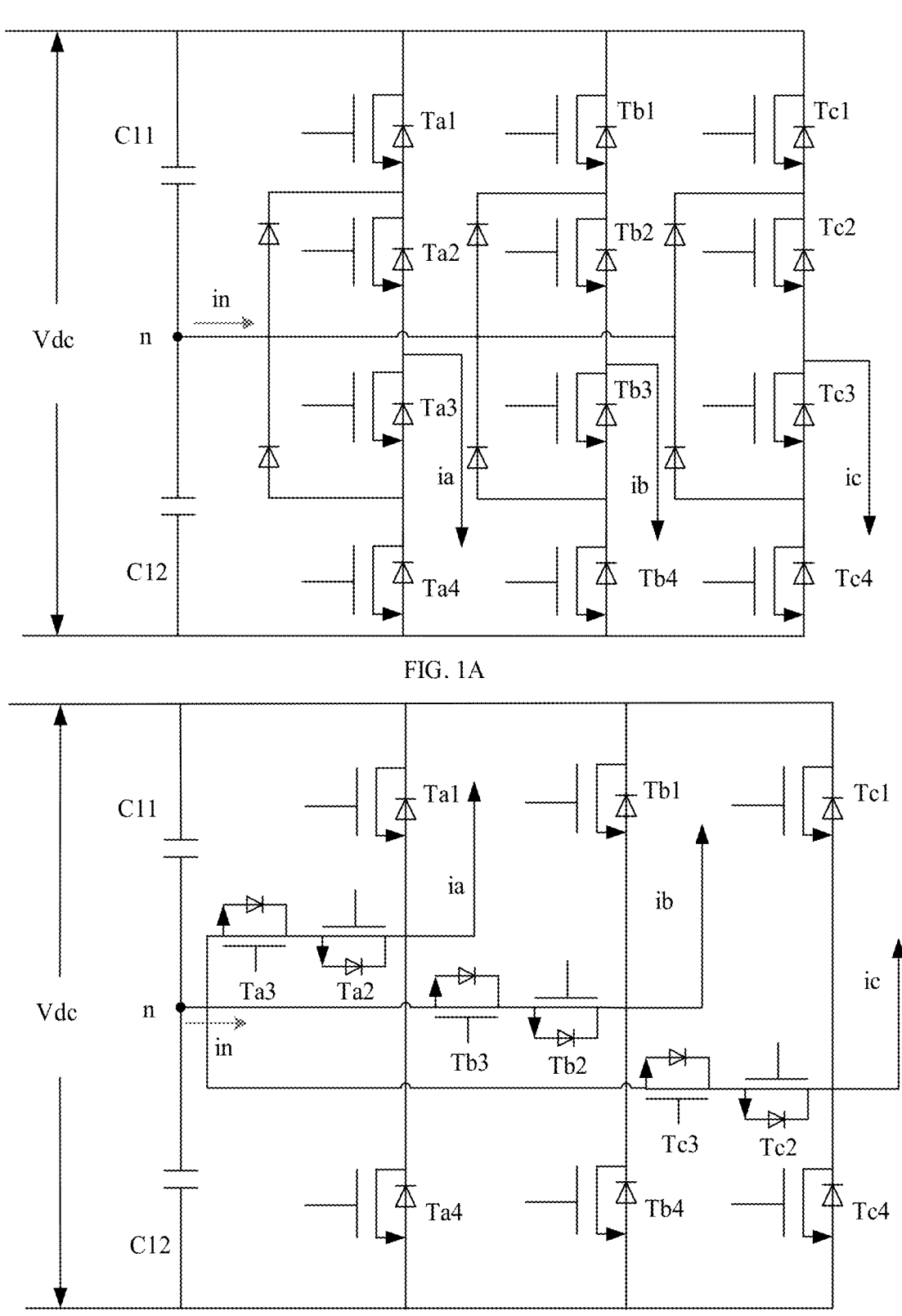
FIGS. 1A and 1B are a schematic of structures of NPC inverter circuits according to this disclosure.
Figure 2:
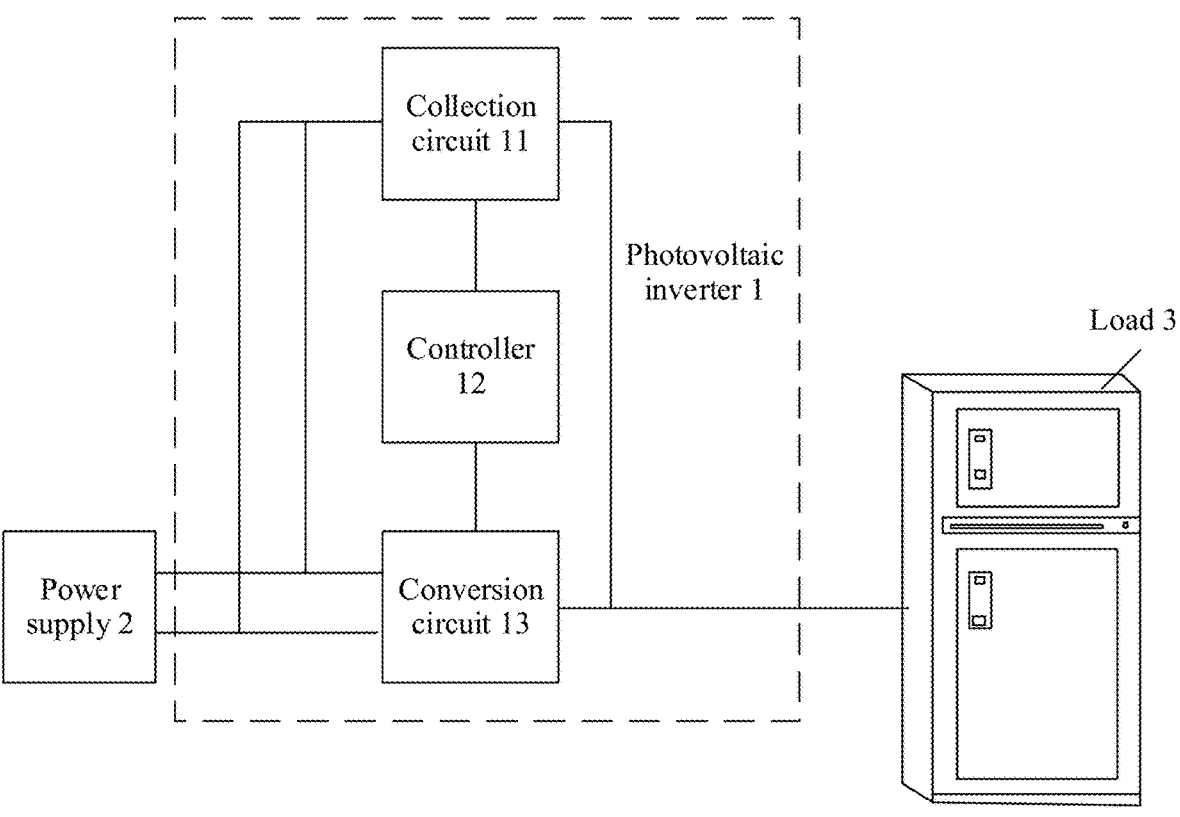
FIG. 2 is a diagram of an application scenario of a photovoltaic inverter according to an embodiment of this disclosure.

FIG. 2 is a schematic of an application scenario of a photovoltaic inverter according to embodiments of this disclosure. In a power supply system powered by pure energy storage, as shown in FIG. 2, the power supply system includes a photovoltaic inverter 1, a power supply 2, and a load 3. The photovoltaic inverter 1 includes a conversion circuit 13, the power supply 2 may be connected to the load 3 through the conversion circuit 13, and an input of the photovoltaic inverter 1 may be separately connected to an input end and an output of the conversion circuit 13. In some feasible implementations, the power supply 2 may supply power to the load 3 through the conversion circuit 13. It may be understood that the power supply 2 provided in this disclosure is applicable to an application scenario in which the power supply 2 supplies power to a plurality of types of electrical devices, for example, supplies power to a base station device in a remote area with no mains electricity or poor mains electricity, or supplies power to a household device (such as a refrigerator or an air conditioner). This may be determined based on an actual application scenario, and is not limited herein. It may be further understood that the load 3 in FIG. 2 may include a power grid, and the power grid herein may include an electrical device or a power transmission device such as a transmission line, a power transfer station, a communication base station, or a household device. The load 3 herein may further include a load (an electric apparatus or a power transmission apparatus) whose voltage and current are in a non-linear relationship in a running (power supply or power consumption) process, such as a motor or a rectifier device. In some feasible implementations, the conversion circuit 13 may be an NPC inverter circuit. Refer to FIG. 1A-1B. As shown in FIG. 1A-1B, the conversion circuit 13 may include two groups of capacitors (for example, C11 and C12) and at least one switching bridge arm (for example, a switching bridge arm including switching transistors Ta1, Ta2, Ta3, and Ta4, a switching bridge arm including switching transistors Tb1, Tb2, Tb3, and Tb4, and a switching bridge arm including switching transistors Tc1, Tc2, Tc3, and Tc4). Herein, a group of capacitors may be one capacitor, or may be a capacitor formed by integrating a plurality of capacitors. In a power supply process, the conversion circuit 13 may separately charge and discharge the two groups of capacitors by turning on and off different switching transistors in the switching bridge arm, to convert direct current electric energy provided by the power supply into alternating current electric energy and transmit the alternating current electric energy to the load. It may be understood that, when an output voltage (or an output current) of the photovoltaic inverter 1 is asymmetric (for example, different switching transistor models, different losses, asymmetric loads, or affected by factors such as a switching deadband), in a power supply cycle, a quantity of charges flowing into a neutral point of the conversion circuit 13 and a quantity of charges flowing out of the neutral point of the conversion circuit 13 are different. In other words, amounts of charged energy (or amounts of discharged energy) of the two groups of capacitors in the conversion circuit 13 are not equal. Consequently, voltages of the two groups of capacitors in the conversion circuit 13 are not equal (that is, a positive direct current bus voltage and a negative direct current bus voltage of the conversion circuit 13 are not equal, or in other words, a voltage at the neutral point of the conversion circuit 13 is unbalanced). As a result, the output voltage (or the output current) of the photovoltaic inverter 1 is distorted, and even a power component in the system is damaged. Herein, the photovoltaic inverter 1 may further include a collection circuit 11 and a controller 12. Herein, the collection circuit 11 may obtain the positive direct current bus voltage and the negative direct current bus voltage of the conversion circuit 13. Further, the controller 12 may generate an even-order harmonic voltage regulation signal based on the positive direct current bus voltage and the negative direct current bus voltage of the conversion circuit 13 and a phase of the output voltage of the photovoltaic inverter 1, generate a drive control signal (for example, a drive control signal such as a PWM wave) based on the even-order harmonic voltage regulation signal, and control a switching transistor in the conversion circuit to be turned on or off. Herein, in addition to controlling the conversion circuit 13 to output a target voltage, the photovoltaic inverter 1 may reduce a difference between the positive direct current bus voltage and the negative direct current bus voltage of the conversion circuit 13, to improve stability of the voltage at the neutral point of the conversion circuit 13. In this way, a structure is simple, a control method is easy, and applicability is high.

The following uses examples to describe the photovoltaic inverter provided in this disclosure and a working principle of the photovoltaic inverter with reference to FIG. 3 to FIG. 9.

Figure 3:
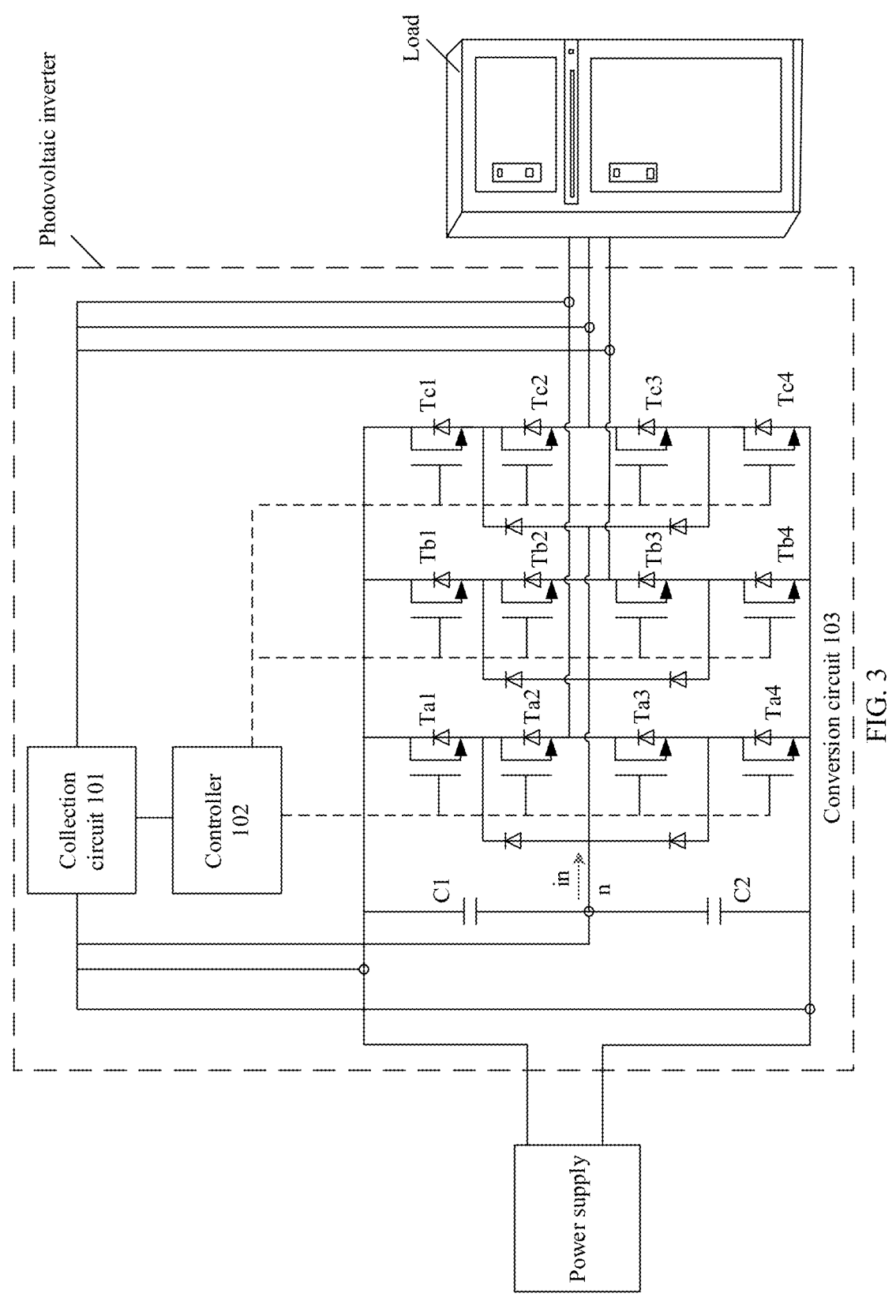
FIG. 3 is a schematic of a structure of a photovoltaic inverter according to an embodiment of this disclosure.

FIG. 3 is a schematic of a structure of a photovoltaic inverter according to an embodiment of this disclosure. As shown in FIG. 3, a power supply system includes a power supply, a photovoltaic inverter, a conversion circuit 103, and a load, and the photovoltaic inverter includes a collection circuit 101 and a controller 102. Herein, the power supply may be connected to the load through the conversion circuit 103, a first sampling end of the collection circuit 101 may be connected to a direct current bus of the conversion circuit 103, a second sampling end of the collection circuit 101 may be connected to an output of the conversion circuit 103, the output of the collection circuit 101 may be connected to one end of the controller 102, and the other end of the controller 102 may be connected to a control end of the conversion circuit 103. Herein, the conversion circuit 103 may include two groups of capacitors (for example, C1 and C2) and at least one switching bridge arm (the conversion circuit 103 shown in FIG. 3 includes three groups of switching bridge arms such as a switching bridge arm including switching transistors Ta1, Ta2, Ta3, and Ta4; a switching bridge arm including switching transistors Tb1, Tb2, Tb3, and Tb4; and a switching bridge arm including switching transistors Tc1, Tc2, Tc3, and Tc4), one of the switching bridge arm includes a plurality of switching transistors, the two groups of capacitors are connected in series and then connected in parallel with the at least one switching bridge arm between a positive direct current bus and a negative direct current bus of the conversion circuit 103, a series connection point of the two groups of capacitors is a neutral point of the conversion circuit 103, three terminals of the first sampling end of the collection circuit are respectively connected to the positive direct current bus, the negative direct current bus, and the neutral point of the conversion circuit 103.

Herein, the controller 102 may generate an even-order harmonic voltage regulation signal based on a positive direct current bus voltage and a negative direct current bus voltage of the conversion circuit 103 and a phase of an output voltage of the photovoltaic inverter. In some feasible implementations, the collection circuit 101 may further obtain the positive direct current bus voltage and the negative direct current bus voltage of the conversion circuit 103 based on a potential of the positive direct current bus, a potential of the negative direct current bus, and a potential of the neutral point of the conversion circuit 103. In this way, a connection manner is simple, a detection method is easy, and detection efficiency is high. The controller 102 may generate a drive control signal (for example, a drive control signal such as a PWM wave) based on the even-order harmonic voltage regulation signal, and control, based on the drive control signal, a switching transistor in the conversion circuit 103 to be turned on or off. Herein, the drive control signal generated by the controller 102 based on the even-order harmonic voltage regulation signal may be used to control the conversion circuit 103 to output an output voltage including an even-order harmonic, and an output current including an even-order harmonic component is generated after the even-order harmonic in the output voltage passes through the load. The even-order harmonic component in the output current may interact with a fundamental component in the drive control signal, and/or an even-order harmonic component in the drive control signal may interact with a fundamental component in the output current, to adjust the potential of the neutral point of the conversion circuit 103, and balance the potential of the neutral point of the conversion circuit 103.

It may be understood that the photovoltaic inverter provided in this disclosure may be applicable to a conversion circuit that uses a DPWM wave as a drive control signal, or may be applicable to a conversion circuit that uses another PWM wave (for example, an SPWM wave, a THIPWM wave, or a CBSVPWM wave) as a drive control signal. Therefore, the photovoltaic inverter is applicable to a wide range of scenarios and has good control effect.

According to the implementations provided in this disclosure, the photovoltaic inverter can reduce a difference between the positive direct current bus voltage and the negative direct current bus voltage of the conversion circuit while controlling the conversion circuit to output a target voltage, to improve stability of a voltage at the neutral point of the conversion circuit. In this way, a structure is simple, a control method is easy, and applicability is high.

In some feasible implementations, the controller 102 may generate an even-order harmonic amplitude signal based on the positive direct current bus voltage and the negative direct current bus voltage. The controller 102 herein may further generate an even-order harmonic phase signal based on the phase of the output voltage. The controller 102 herein may further generate the even-order harmonic voltage regulation signal based on the even-order harmonic amplitude signal and the even-order harmonic phase signal. It may be understood that the controller 102 may obtain a voltage difference at the neutral point of the conversion circuit 103 based on the positive direct current bus voltage and the negative direct current bus voltage of the conversion circuit, and generate the even-order harmonic amplitude signal based on the voltage difference at the neutral point of the conversion circuit 103. The controller 102 may further generate a corresponding even-order harmonic phase signal by performing frequency multiplication based on the phase of the output voltage of the photovoltaic inverter. In addition, it may be understood that the controller 102 may further generate the even-order harmonic voltage regulation signal based on the even-order harmonic amplitude signal and the even-order harmonic phase signal, further generate the drive control signal based on the even-order harmonic voltage regulation signal, and control, based on the drive control signal, the switching transistor in the conversion circuit 103 to be turned on or off. It may be further understood that the even-order harmonic voltage regulation signal herein may be an even-order harmonic voltage regulation signal generated based on one type of even-order harmonic (for example, a second-order harmonic), or may be an even-order harmonic voltage regulation signal generated by superimposing a plurality of types of even-order harmonics (for example, a second-order harmonic and a fourth-order harmonic).

According to the implementations provided in this disclosure, the photovoltaic inverter may determine an amplitude of the even-order harmonic voltage regulation signal based on the positive direct current bus voltage and the negative direct current bus voltage of the conversion circuit, determine a phase of the even-order harmonic voltage regulation signal based on the phase of the output voltage of the photovoltaic inverter, and further generate the drive control signal based on the even-order harmonic voltage regulation signal. The photovoltaic inverter reduces the difference between the positive direct current bus voltage and the negative direct current bus voltage of the conversion circuit while controlling the conversion circuit to output the target voltage, to improve the stability of the voltage at the neutral point of the conversion circuit. In this way, a structure is simple, a control method is accurate and easy, and applicability is high.

In some feasible implementations, the collection circuit 101 may be further configured to obtain the phase of the output voltage of the photovoltaic inverter and a phase of an output current of the photovoltaic inverter. The controller 102 may further determine a type of the load based on the phase of the output voltage of the photovoltaic inverter and the phase of the output current of the photovoltaic inverter, and generate the even-order harmonic phase signal based on the phase of the output voltage of the photovoltaic inverter and the type of the load. Herein, the type of the load is one or more of an inductive load, a capacitive load, and/or a resistive load. It may be understood that the photovoltaic inverter may obtain the phase of the output voltage of the photovoltaic inverter and the phase of the output current of the photovoltaic inverter through the collection circuit 101, and further determine the type of the load based on the phase of the output voltage of the photovoltaic inverter and the phase of the output current of the photovoltaic inverter. Herein, for different types of loads, different phases have different adjustment effects. In an example, for different types of loads, the photovoltaic inverter may correspondingly generate a first phase for the resistive load, correspondingly generate a second phase for the capacitive load, and correspondingly generate a third phase for the inductive load. Alternatively, the photovoltaic inverter may generate a fourth phase for a plurality of types of mixed loads. Alternatively, the photovoltaic inverter may superimpose a first phase, a second phase, or a third phase for a plurality of types of mixed loads based on weights, to generate a new phase (for example, a fifth phase), and superimpose the first phase, the second phase, the third phase, the fourth phase, or the fifth phase with the phase that is of the output voltage of the photovoltaic inverter and based on which frequency multiplication is performed, to generate the even-order harmonic phase signal. Further, it may be understood that the photovoltaic inverter herein may alternatively determine output power (including active power and reactive power) of the photovoltaic inverter based on the output voltage and the output current of the photovoltaic inverter, and determine the type of the load based on symbols of the active power and the reactive power of the photovoltaic inverter. Alternatively, the photovoltaic inverter may determine a power factor of the photovoltaic inverter based on the output voltage and the output current of the photovoltaic inverter, and determine the type of the load based on the power factor of the photovoltaic inverter. This may be determined based on an application scenario. Herein, the photovoltaic inverter may generate the even-order harmonic voltage regulation signal based on the even-order harmonic amplitude signal and the even-order harmonic phase signal. The even-order harmonic voltage regulation signal herein may be an even-order harmonic voltage regulation signal generated based on one type of even-order harmonic (for example, a second-order harmonic), or may be an even-order harmonic voltage regulation signal generated by superimposing a plurality of types of even-order harmonics (for example, a second-order harmonic and a fourth-order harmonic). Further, it may be further understood that the photovoltaic inverter herein may generate a plurality of even-order harmonic phase signals with different phases for a plurality of types of mixed loads, generate a plurality of even-order harmonic voltage regulation signals based on the plurality of even-order harmonic phase signals with different phases and the even-order harmonic amplitude signal, and superimpose the plurality of even-order harmonic voltage regulation signals based on weights to obtain an even-order harmonic voltage regulation signal.

According to this disclosure, the photovoltaic inverter may determine the type of the load based on the phase of the output voltage and the phase of the output current of the photovoltaic inverter, determine the phase of the even-order harmonic voltage regulation signal based on the phase of the output voltage of the photovoltaic inverter and the type of the load, and then generate the drive control signal based on the even-order harmonic voltage regulation signal. In an example, the photovoltaic inverter may generate targeted drive control signals based on different types of loads, to reduce the difference between the positive direct current bus voltage and the negative direct current bus voltage of the conversion circuit while controlling the conversion circuit to output the target voltage, thereby improving the stability of the voltage at the neutral point of the conversion circuit. In this way, a structure is simple, a control method is easy, applicability is high, and control efficiency is high.

Figure 4:
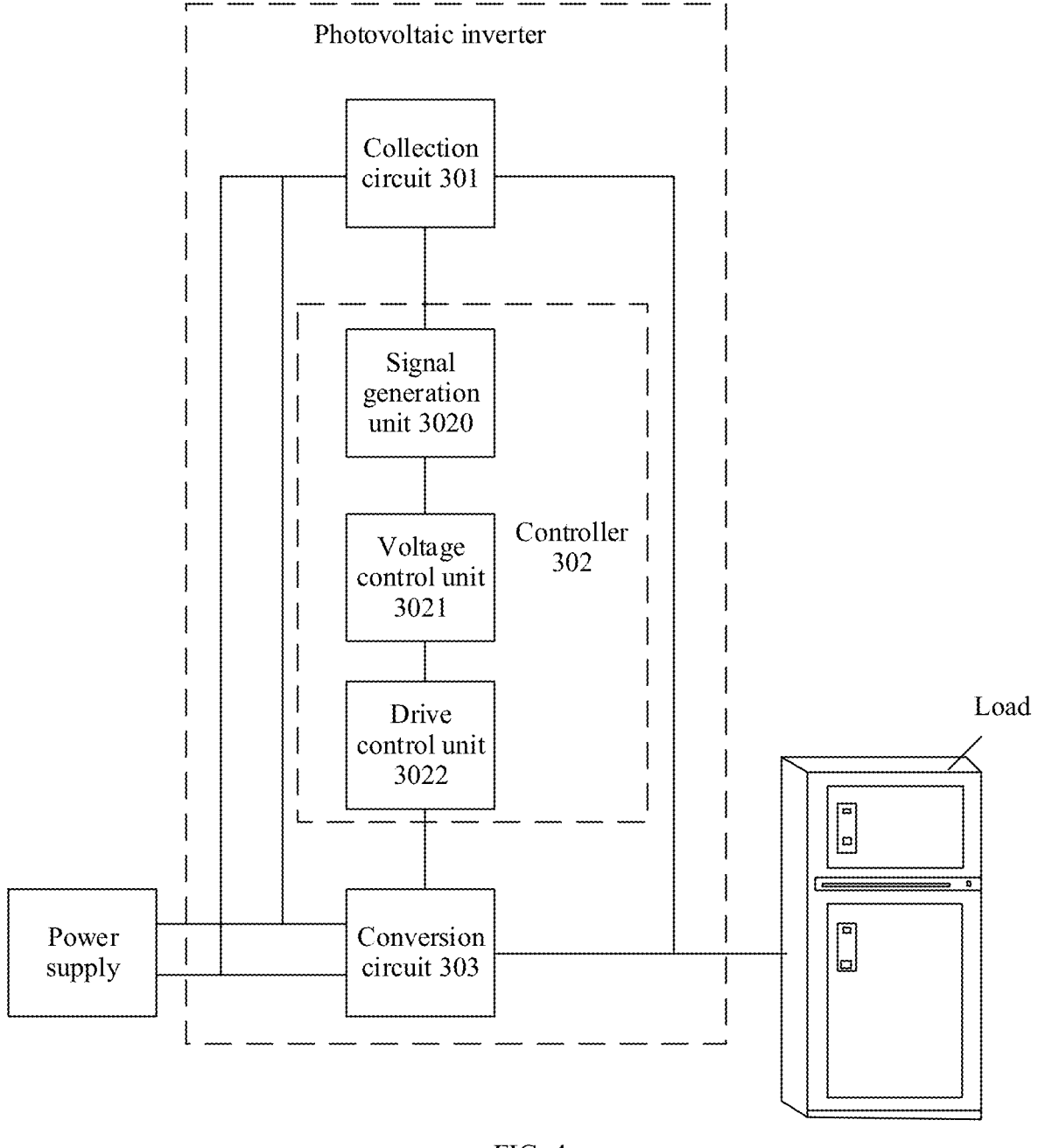
FIG. 4 is a schematic of another structure of a photovoltaic inverter according to an embodiment of this disclosure.

In some feasible implementations, the controller may include a signal generation unit, a voltage control unit, and a drive control unit. FIG. 4 is a schematic of another structure of a photovoltaic inverter according to an embodiment of this disclosure. As shown in FIG. 4, a controller 302 herein may include a signal generation unit 3020, a voltage control unit 3021, and a drive control unit 3022, the signal generation unit 3020 may be connected to the voltage control unit 3021 and a collection circuit 301, and the voltage control unit 3021 may be connected to a conversion circuit 303 through the drive control unit 3022. The signal generation unit 3020 herein may generate an even-order harmonic amplitude signal based on a positive direct current bus voltage and a negative direct current bus voltage, generate an even-order harmonic phase signal based on a phase of an output voltage of the photovoltaic inverter, generate an even-order harmonic voltage regulation signal based on the even-order harmonic amplitude signal and the even-order harmonic phase signal. The voltage control unit 3021 herein may generate a voltage instruction signal of the conversion circuit 303 based on the even-order harmonic voltage regulation signal. The drive control unit 3022 herein may generate a drive control signal based on the voltage instruction signal of the conversion circuit 303, and control, based on the drive control signal, a switching transistor in the conversion circuit 303 to be turned on or off. It may be understood that the photovoltaic inverter herein may generate the voltage instruction signal of the conversion circuit 303 based on the even-order harmonic voltage regulation signal, and then the photovoltaic inverter may generate the drive control signal based on the voltage instruction signal, and control, based on the drive control signal, the switching transistor in the conversion circuit 303 to be turned on or off, so that not only the conversion circuit 303 outputs a target voltage, but also a voltage at a neutral point of the conversion circuit 303 remains stable. In this way, a structure is simple, and a control method is easy.

In some feasible implementations, the voltage control unit 3021 may be further configured to obtain a fundamental wave instruction of an external central control system. The voltage control unit 3021 herein may be further configured to superimpose the fundamental wave instruction and the even-order harmonic voltage regulation signal to obtain the voltage instruction signal of the conversion circuit 303. It may be understood that the photovoltaic inverter herein may obtain the fundamental wave instruction sent by the external central control system, directly obtain a fundamental wave signal based on the fundamental wave instruction or obtain a fundamental wave signal through calculation, and superpose and modulate the fundamental wave signal and the even-order harmonic voltage regulation signal, to obtain the voltage instruction signal of the conversion circuit 303, and further, the drive control unit 3022 may generate the drive control signal based on the voltage instruction signal, and control, based on the drive control signal, the switching transistor in the conversion circuit 303 to be turned on or off. In this way, a structure is simple, a control method is easy, and control efficiency is high.

Figure 5:
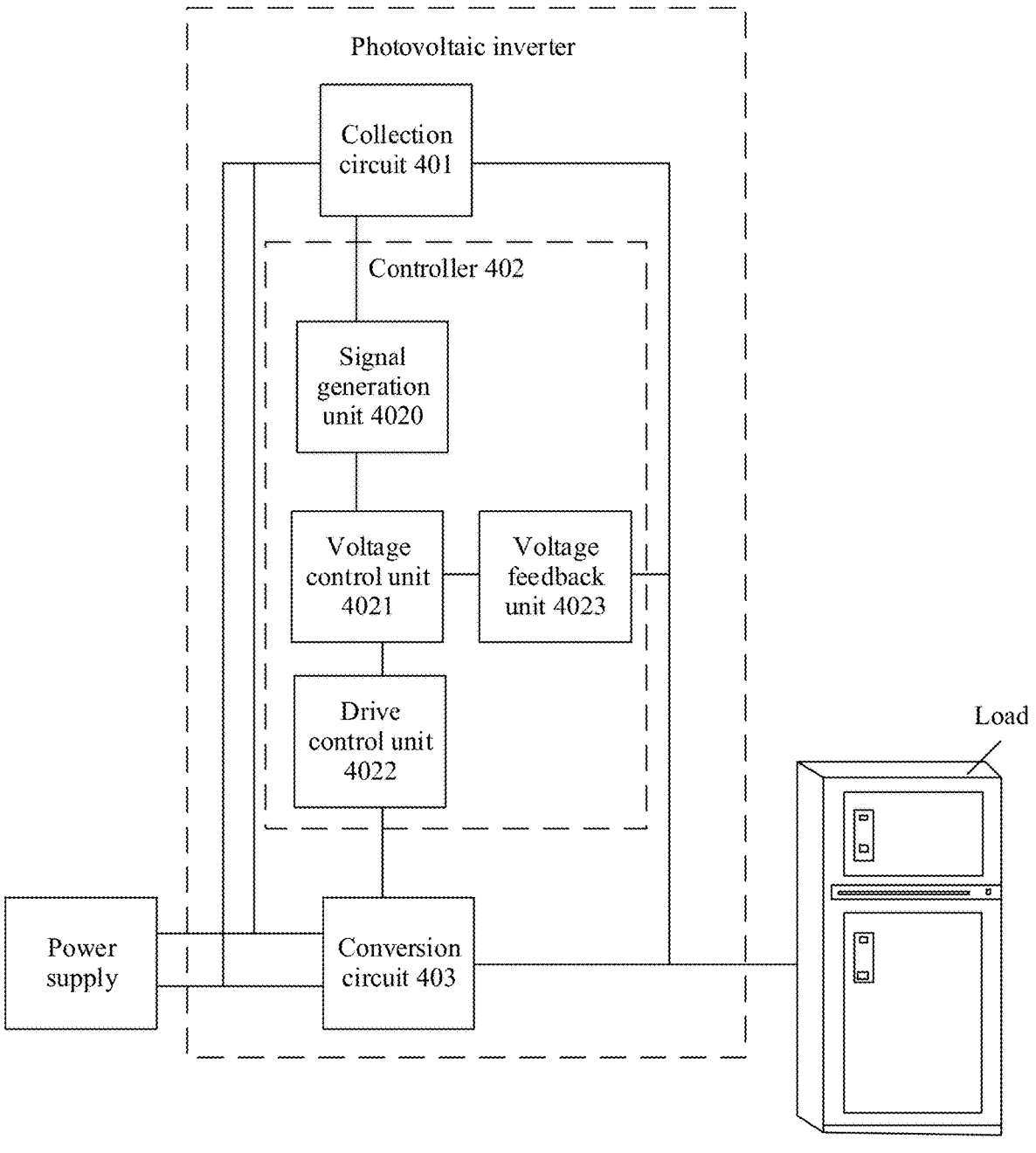
FIG. 5 is a schematic of another structure of a photovoltaic inverter according to an embodiment of this disclosure.

In some feasible implementations, the controller may further include a voltage feedback unit. For details, refer to FIG. 5. FIG. 5 is a schematic of another structure of a photovoltaic inverter according to an embodiment of this disclosure. As shown in FIG. 5, a controller 402 may further include a voltage feedback unit 4023. The voltage feedback unit 4023 herein may be connected to a collection circuit 401 and a voltage control unit 4021. Connection manners and working principles of the collection circuit 401 and a signal generation unit 4020 in FIG. 5 are the same as those of the collection circuit 301 and the signal generation unit 3020 in FIG. 4. Details are not described herein again. The voltage feedback unit 4023 herein may be configured to obtain an output voltage of the photovoltaic inverter through the collection circuit 401, and use the output voltage of the photovoltaic inverter as a voltage feedback signal. The voltage control unit 4021 herein may further generate a level-1 voltage instruction signal based on the voltage feedback signal and a voltage instruction signal of a conversion circuit 403. The drive control unit 4022 herein may further generate a drive control signal based on the level-1 voltage instruction signal. It may be understood that the voltage control unit 4021 herein may be a voltage control loop, and the voltage feedback unit 4023 herein may obtain the output voltage of the photovoltaic inverter, and input the output voltage of the photovoltaic inverter to the voltage control unit as the voltage feedback signal, and further, the voltage control unit may adjust the voltage instruction signal by comparing the voltage instruction signal with the voltage feedback signal, to generate the level-1 voltage instruction signal (that is, a voltage instruction signal adjusted based on the voltage feedback signal). Further, the drive control unit 4022 may further generate the drive control signal based on the level-1 voltage instruction signal, and control, based on the drive control signal, a switching transistor in the conversion circuit 403 to be turned on or off.

According to the implementations provided in this disclosure, not only the conversion circuit outputs a target voltage, but also a voltage at a neutral point of the conversion circuit remains stable. In this way, a structure is simple, and a control method is easy. In addition, the photovoltaic inverter may adjust the drive control signal in real time by using the output voltage of the photovoltaic inverter as the voltage feedback signal. Therefore, control efficiency is high.

Figure 6:
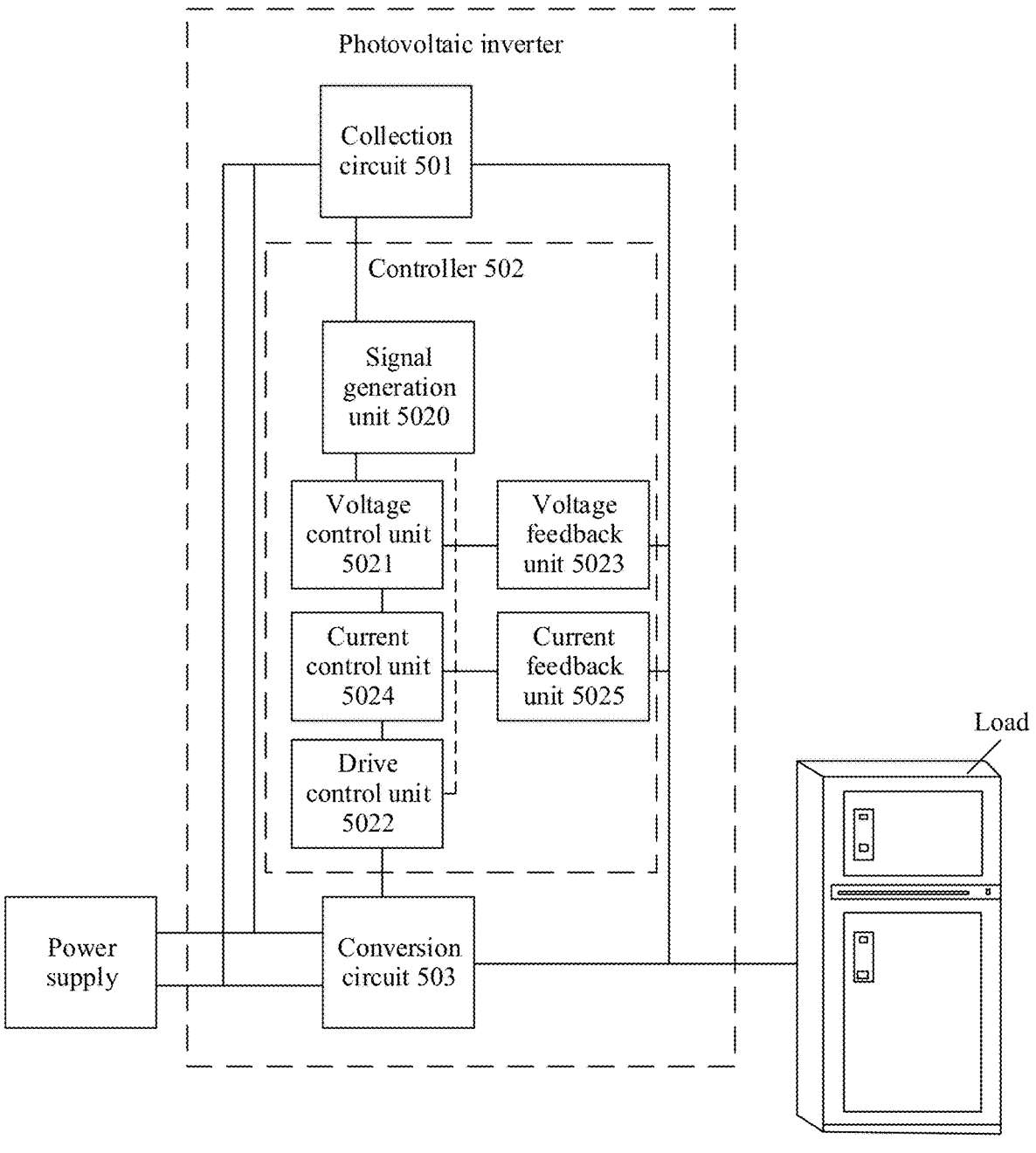
FIG. 6 is a schematic of another structure of a photovoltaic inverter according to an embodiment of this disclosure.

In some feasible implementations, the controller may further include a current control unit and a current feedback unit. For details, refer to FIG. 6. FIG. 6 is a schematic of another structure of a photovoltaic inverter according to an embodiment of this disclosure. As shown in FIG. 6, a controller 502 may further include a current control unit 5024 and a current feedback unit 5025. Herein, the current control unit 5024 may be connected to a voltage control unit 5021 and a drive control unit 5022, and the current feedback unit 5025 may be connected to a collection circuit 501 and the current control unit 5024. A connection manner and a working principle of the collection circuit 501 in FIG. 6 are the same as those of the collection circuit 401 in FIG. 5. Details are not described herein again. The current feedback unit 5025 herein may obtain an output current of the photovoltaic inverter through the collection circuit 501, and use the output current of the photovoltaic inverter as a current feedback signal. The current control unit 5024 herein may generate a level-2 voltage instruction signal based on a level-1 voltage instruction signal output by the voltage control unit 5021 and the current feedback signal. The drive control unit 5022 herein may further generate a drive control signal based on the level-2 voltage instruction signal. It may be understood that the current control unit 5024 herein may be a current control loop, and the current feedback unit 5025 herein may obtain the output current of the photovoltaic inverter, and input the output current of the photovoltaic inverter to the current control unit 5024 as the current feedback signal, and further, the current control unit 5024 may adjust the level-1 voltage instruction signal output by the voltage control unit 5021 by comparing the level-1 voltage instruction signal with the current feedback signal, to generate the level-2 voltage instruction signal (that is, a voltage instruction signal adjusted based on the voltage feedback signal and the current feedback signal). Herein, the drive control unit 5022 may further generate the drive control signal based on the level-2 voltage instruction signal, and control, based on the drive control signal, a switching transistor in the conversion circuit 503 to be turned on or off.

According to the implementations provided in this disclosure, not only the conversion circuit outputs a target voltage, but also a voltage at a neutral point of the conversion circuit remains stable. In this way, a structure is simple, and a control method is easy. In addition, the photovoltaic inverter may adjust the drive control signal in real time by using the output current of the photovoltaic inverter as the current feedback signal. Therefore, control efficiency is high.

In some feasible implementations, the drive control unit 5022 may be further connected to the signal generation unit 5020. The drive control unit 5022 herein may be further configured to obtain an even-order harmonic voltage regulation signal of the signal generation unit 5020, and generate the drive control signal based on the even-order harmonic voltage regulation signal and the level-2 voltage instruction signal. Herein, the drive control unit 5022 may also obtain the even-order harmonic voltage regulation signal of the signal generation unit 5020 and a fundamental wave signal generated based on a fundamental wave instruction of an external central control system (or may directly obtain a signal obtained by superimposing the even-order harmonic voltage regulation signal and a fundamental wave signal), and generate the drive control signal based on the even-order harmonic voltage regulation signal, the fundamental wave signal, and the level-2 voltage instruction signal. It may be understood that the drive control unit 5022 herein may be a generation circuit of a PWM wave or a generation circuit of another type of modulation signal, or may be a generation circuit of a PWM wave or a combination circuit of a generation circuit of another type of modulation signal and a switching transistor drive circuit. The drive control unit 5022 herein may obtain the even-order harmonic voltage regulation signal output by the signal generation unit 5020, and further, the drive control unit 5022 may generate the drive control signal based on the even-order harmonic voltage regulation signal and the level-2 voltage instruction signal. In some feasible implementations, when the photovoltaic inverter does not include the current control unit 5024 and the current feedback unit 5025, the drive control unit 5022 may also generate the drive control signal based on the even-order harmonic voltage regulation signal and the level-1 voltage instruction signal (that is, a voltage instruction signal adjusted by the voltage control unit 5021 based on the voltage feedback signal transmitted by the voltage feedback unit 5023).

According to the implementations provided in this disclosure, not only the conversion circuit outputs the target voltage, but also the voltage at the neutral point of the conversion circuit remains stable. In this way, a structure is simple, and a control method is easy. In addition, the drive control unit may further generate the drive control signal based on the even-order harmonic voltage regulation signal and the level-2 voltage instruction signal. This is equivalent to injecting an even-order harmonic component to the drive control signal, to further maintain a neutral point balance of the conversion circuit. Therefore, control efficiency is high.

Figure 7:
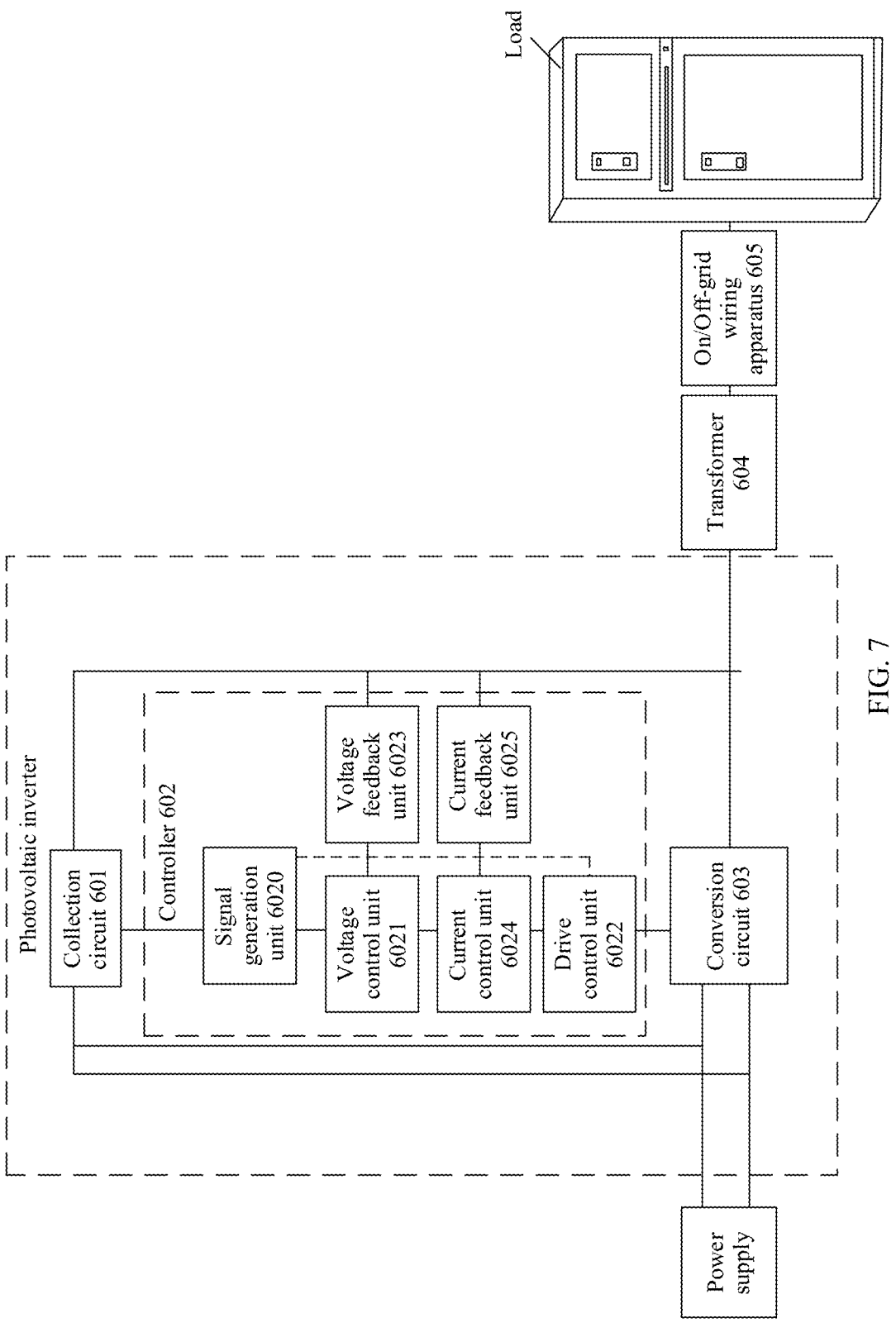
FIG. 7 is a schematic of a structure of a power supply system according to an embodiment of this disclosure.

In some feasible implementations, FIG. 7 is a schematic of a structure of a power supply system according to an embodiment of this disclosure. As shown in FIG. 7, the power supply system includes a power supply and a photovoltaic inverter. The photovoltaic inverter herein is applicable to any one of the power supply systems shown in FIG. 1A to FIG. 6 or the photovoltaic inverters in the power supply systems. In FIG. 7, only the photovoltaic inverter shown in FIG. 6 is used as an example for description. It may be understood that connection manners and working principles of a signal generation unit 6020, a voltage control unit 6021, a drive control unit 6022, a voltage feedback unit 6023, a current control unit 6024, and a current feedback unit 6025 that are in a controller 602 and a collection circuit 601 in FIG. 7 are the same as those of the signal generation unit 5020, the voltage control unit 5021, the drive control unit 5022, the voltage feedback unit 5023, the current control unit 5024, and the current feedback unit 5025 that are in the controller 502 and the collection circuit 501 in FIG. 6. Details are not described herein again. The power supply system shown in FIG. 7 may further include a transformer 604, and the transformer 604 may be connected to a conversion circuit 603 and a load. Further refer to FIG. 7. The power supply system may further include an on/off-grid wiring apparatus 605, the conversion circuit 603 may supply power to an electrical device or an electrical transmission device in the load, for example, a transmission line, an electrical transfer station, a battery, a communication base station, or a household device, by using the on/off-grid wiring apparatus 605.

In this disclosure, the photovoltaic inverter, the power supply system, and functional modules in the power supply system have various and flexible composition manners, and can adapt to different power supply environments. Therefore, diversity of application scenarios of the power supply system is improved, and adaptability of the power supply system is enhanced. In addition, any power supply system or photovoltaic inverter shown in FIG. 1A to FIG. 7 may control turn-on or turn-off time of the switching transistor in the conversion circuit, to reduce the difference between the positive direct current bus voltage and the negative direct current bus voltage of the conversion circuit while controlling the conversion circuit to output the target voltage, thereby improving the stability of the voltage at the neutral point of the conversion circuit. In this way, a structure is simple, a control method is easy, and applicability is high. For ease of description, the following uses the structure of the power supply system shown in FIG. 2 as an example to describe on-grid control methods provided in embodiments of this disclosure.

FIG. 8 is a schematic flowchart of a control method according to this disclosure. The control method provided in this disclosure is applicable to a photovoltaic inverter. The photovoltaic inverter includes a conversion circuit and positive and negative direct current buses. One end of the positive and negative direct current buses is connected to the conversion circuit, and the other end of the positive and negative direct current buses is configured to connect to a power supply. The control method is also applicable to any one of the power supply systems shown in FIG. 1A to FIG. 7 or the photovoltaic inverters in the power supply systems. As shown in FIG. 8, the control method provided in this disclosure includes the following steps.

S701: Detect a positive direct current bus voltage of the conversion circuit and a negative direct current bus voltage of the conversion circuit.

S702: Generate an even-order harmonic voltage regulation signal based on the positive direct current bus voltage of the conversion circuit, the negative direct current bus voltage of the conversion circuit, and a phase of an output voltage of the photovoltaic inverter, generate a drive control signal based on the even-order harmonic voltage regulation signal, and control a switching transistor in the conversion circuit to be turned on or off.

In an implementation provided in this disclosure, the photovoltaic inverter may generate the even-order harmonic voltage regulation signal based on the positive direct current bus voltage and the negative direct current bus voltage of the conversion circuit and the phase of the output voltage of the photovoltaic inverter. Further, the photovoltaic inverter may generate a drive control signal based on the even-order harmonic voltage regulation signal, and control, based on the drive control signal, the switching transistor in the conversion circuit to be turned on or off. Herein, the drive control signal generated based on the even-order harmonic voltage regulation signal may be used to control the conversion circuit to output an output voltage including an even-order harmonic, an output current including an even-order harmonic component is generated after the even-order harmonic in the output voltage passes through a load, the even-order harmonic component in the output current may interact with a fundamental component in the drive control signal, and/or an even-order harmonic component in the drive control signal may interact with the fundamental component in the output current, to adjust a potential of a neutral point of the conversion circuit. In this way, the potential of the neutral point of the conversion circuit remains balanced.

According to this disclosure, the photovoltaic inverter can reduce the difference between the positive direct current bus voltage and the negative direct current bus voltage of the conversion circuit while controlling the conversion circuit to output the target voltage, to improve stability of a voltage at a neutral point of the conversion circuit. In this way, a structure is simple, a control method is easy, and applicability is high.

In some feasible implementations, the conversion circuit may include two groups of capacitors and at least one switching bridge arm. When step S701 in which the positive direct current bus voltage of the conversion circuit and the negative direct current bus voltage of the conversion circuit are detected is performed, the method may include detecting the positive direct current bus voltage and the negative direct current bus voltage of the conversion circuit based on a potential of the positive direct current bus, a potential of the negative direct current bus, and the potential of the neutral point of the conversion circuit. In this method, a connection manner is simple, a detection method is easy, and detection efficiency is high.

In some feasible implementations, refer to FIG. 9. FIG. 9 is another schematic flowchart of a control method according to this disclosure. As shown in FIG. 9, step S701 in which the even-order harmonic voltage regulation signal is generated based on the positive direct current bus voltage of the conversion circuit, the negative direct current bus voltage of the conversion circuit, and the phase of the output voltage of the photovoltaic inverter may include the following steps.

S801: Generate an even-order harmonic amplitude signal based on the positive direct current bus voltage of the conversion circuit and the negative direct current bus voltage of the conversion circuit.

S802: Generate an even-order harmonic phase signal based on the phase of the output voltage of the photovoltaic inverter.

S803: Generate the even-order harmonic voltage regulation signal based on the even-order harmonic amplitude signal and the even-order harmonic phase signal.

It may be understood that the photovoltaic inverter may detect the positive direct current bus voltage and the negative direct current bus voltage of the conversion circuit, to further obtain a voltage difference at the neutral point of the conversion circuit, and generate the even-order harmonic amplitude signal based on the voltage difference at the neutral point of the conversion circuit. The photovoltaic inverter may detect the phase of the output voltage of the photovoltaic inverter, and further generate a corresponding even-order harmonic phase signal by performing frequency multiplication based on the phase of the output voltage of the photovoltaic inverter. It may be understood that the photovoltaic inverter may generate the even-order harmonic voltage regulation signal based on the even-order harmonic amplitude signal and the even-order harmonic phase signal, further generate the drive control signal (for example, a drive control signal such as a PWM wave) based on the even-order harmonic voltage regulation signal, and control, based on the drive control signal, the switching transistor in the conversion circuit to be turned on or off. It may be further understood that the even-order harmonic voltage regulation signal herein may be an even-order harmonic voltage regulation signal generated based on one type of even-order harmonic (for example, a second-order harmonic), or may be an even-order harmonic voltage regulation signal generated by superimposing a plurality of types of even-order harmonics (for example, a second-order harmonic and a fourth-order harmonic).

According to this disclosure, the photovoltaic inverter may determine an amplitude of the even-order harmonic voltage regulation signal based on the positive direct current bus voltage and the negative direct current bus voltage of the conversion circuit, determine a phase of the even-order harmonic voltage regulation signal based on the phase of the output voltage of the photovoltaic inverter, and further generate the drive control signal based on the even-order harmonic voltage regulation signal. The photovoltaic inverter reduces the difference between the positive direct current bus voltage and the negative direct current bus voltage of the conversion circuit while controlling the conversion circuit to output the target voltage, to improve the stability of the voltage at the neutral point of the conversion circuit. In this way, a structure is simple, a control method is accurate and easy, and applicability is high.

In some feasible implementations, step S802 in which the even-order harmonic phase signal is generated based on the phase of the output voltage of the photovoltaic inverter may include detecting the phase of the output voltage of the photovoltaic inverter and a phase of an output current of the photovoltaic inverter, and determining a type of a load based on the phase of the output voltage of the photovoltaic inverter and the phase of the output current of the photovoltaic inverter, and generating the even-order harmonic phase signal based on the phase of the output voltage of the photovoltaic inverter and the type of the load, where the type of the load is one or more of an inductive load, a capacitive load, and/or a resistive load. It may be understood that the photovoltaic inverter may detect the phase of the output voltage of the photovoltaic inverter and the phase of the output current of the photovoltaic inverter through the collection circuit, and further determine the type of the load based on the phase of the output voltage of the photovoltaic inverter and the phase of the output current of the photovoltaic inverter. Herein, for different types of loads, different phases have different adjustment effects. In an example, for different types of loads, the photovoltaic inverter may correspondingly generate a first phase for the resistive load, correspondingly generate a second phase for the capacitive load, and correspondingly generate a third phase for the inductive load. Alternatively, the photovoltaic inverter may generate a fourth phase for a plurality of types of mixed loads. Alternatively, the photovoltaic inverter may superimpose a first phase, a second phase, or a third phase for a plurality of types of mixed loads based on weights, to generate a new phase (for example, a fifth phase), and superimpose the first phase, the second phase, the third phase, the fourth phase, or the fifth phase with the phase that is of the output voltage of the photovoltaic inverter and based on which frequency multiplication is performed, to generate the even-order harmonic phase signal. Further, it may be understood that the photovoltaic inverter herein may alternatively determine output power (including active power and reactive power) of the photovoltaic inverter based on the output voltage and the output current of the photovoltaic inverter, and determine the type of the load based on symbols of the active power and the reactive power of the conversion circuit. Alternatively, the photovoltaic inverter may determine a power factor of the conversion circuit based on the output voltage and the output current of the photovoltaic inverter, and determine the type of the load based on the power factor of the conversion circuit. This may be determined based on an application scenario. Herein, the photovoltaic inverter may generate the even-order harmonic voltage regulation signal based on the even-order harmonic amplitude signal and the even-order harmonic phase signal. The even-order harmonic voltage regulation signal herein may be an even-order harmonic voltage regulation signal generated based on one type of even-order harmonic (for example, a second-order harmonic), or may be an even-order harmonic voltage regulation signal generated by superimposing a plurality of types of even-order harmonics (for example, a second-order harmonic and a fourth-order harmonic).

According to this disclosure, the photovoltaic inverter may determine the type of the load based on the phase of the output voltage and the phase of the output current of the photovoltaic inverter, determine the phase of the even-order harmonic voltage regulation signal based on the phase of the output voltage of the photovoltaic inverter and the type of the load, and then generate the drive control signal based on the even-order harmonic voltage regulation signal. In an example, the photovoltaic inverter may generate targeted drive control signals based on different types of loads, to reduce the difference between the positive direct current bus voltage and the negative direct current bus voltage of the conversion circuit while controlling the conversion circuit to output the target voltage, thereby improving the stability of the voltage at the neutral point of the conversion circuit. In this way, a structure is simple, a control method is easy, applicability is high, and control efficiency is high.

In some feasible implementations, step S702 in which the drive control signal is generated based on the even-order harmonic voltage regulation signal may include generating a voltage instruction signal of the conversion circuit based on the even-order harmonic voltage regulation signal, and generating the drive control signal based on the voltage instruction signal of the conversion circuit. It may be understood that the photovoltaic inverter herein may generate the voltage instruction signal of the conversion circuit based on the even-order harmonic voltage regulation signal, and then the photovoltaic inverter may generate the drive control signal based on the voltage instruction signal, and control, based on the drive control signal, the switching transistor in the conversion circuit to be turned on or off, so that not only the conversion circuit outputs the target voltage, but also the voltage at the neutral point of the conversion circuit remains stable. In this way, a structure is simple, and a control method is easy.

In some feasible implementations, step S702 in which the voltage instruction signal of the conversion circuit is generated based on the even-order harmonic voltage regulation signal may include detecting a fundamental wave instruction of an external central control system, and superposing the fundamental wave instruction and the even-order harmonic voltage regulation signal to obtain the voltage instruction signal of the conversion circuit. It may be understood that the photovoltaic inverter herein may detect the fundamental wave instruction sent by the external central control system, directly obtain a fundamental wave signal based on the fundamental wave instruction or obtain a fundamental wave signal through calculation, and superpose and modulate the fundamental wave signal and the even-order harmonic voltage regulation signal, to obtain the voltage instruction signal of the conversion circuit, and further, the photovoltaic inverter may generate the drive control signal based on the voltage instruction signal, and control, based on the drive control signal, the switching transistor in the conversion circuit to be turned on or off. In this way, a structure is simple, a control method is easy, and control efficiency is high.

In some feasible implementations, after step S702 in which the voltage instruction signal of the conversion circuit is generated based on the even-order harmonic voltage regulation signal is performed, the method may further include detecting the output voltage of the photovoltaic inverter, and using the output voltage of the photovoltaic inverter as a voltage feedback signal, generating a level-1 voltage instruction signal based on the voltage feedback signal and the voltage instruction signal of the conversion circuit, and generating the drive control signal based on the level-1 voltage instruction signal. It may be understood that the photovoltaic inverter herein may detect the output voltage of the photovoltaic inverter, and use the output voltage of the photovoltaic inverter as the voltage feedback signal, so that the photovoltaic inverter may adjust the voltage instruction signal by comparing the voltage instruction signal with the voltage feedback signal, and generate the level-1 voltage instruction signal (that is, a voltage instruction signal adjusted based on the voltage feedback signal). Further, the photovoltaic inverter may further generate the drive control signal based on the level-1 voltage instruction signal, and control, based on the drive control signal, the switching transistor in the conversion circuit to be turned on or off.

According to the implementations provided in this disclosure, not only the conversion circuit outputs a target voltage, but also a voltage at a neutral point of the conversion circuit remains stable. In this way, a structure is simple, and a control method is easy. In addition, the photovoltaic inverter may adjust the drive control signal in real time by using the output voltage of the photovoltaic inverter as the voltage feedback signal. Therefore, control efficiency is high.

In some feasible implementations, after the level-1 voltage instruction signal is generated based on the voltage feedback signal and the voltage instruction signal of the conversion circuit, the method may further include detecting the output current of the photovoltaic inverter, and using the output current of the photovoltaic inverter as a current feedback signal, generating a level-2 voltage instruction signal based on the level-1 voltage instruction signal and the current feedback signal, and generating the drive control signal based on the level-2 voltage instruction signal. It may be understood that the photovoltaic inverter herein may detect the output current of the photovoltaic inverter, and use the output current of the photovoltaic inverter as the current feedback signal, so that the photovoltaic inverter may adjust the level-1 voltage instruction signal by comparing the level-1 voltage instruction signal with the current feedback signal, and generate the level-2 voltage instruction signal (that is, a voltage instruction signal adjusted based on the voltage feedback signal and the current feedback signal). Herein, the photovoltaic inverter may further generate the drive control signal based on the level-2 voltage instruction signal, and control, based on the drive control signal, the switching transistor in the conversion circuit to be turned on or off.

According to the implementations provided in this disclosure, not only the conversion circuit outputs a target voltage, but also a voltage at a neutral point of the conversion circuit remains stable. In this way, a structure is simple, and a control method is easy. In addition, the photovoltaic inverter may adjust the drive control signal in real time by using the output current of the photovoltaic inverter as the current feedback signal. Therefore, control efficiency is high.

In some feasible implementations, after the level-2 voltage instruction signal is generated based on the level-1 voltage instruction signal and the current feedback signal, the method may further include detecting the even-order harmonic voltage regulation signal of the signal generation unit, and generating the drive control signal based on the even-order harmonic voltage regulation signal and the level-2 voltage instruction signal. Herein, the photovoltaic inverter may also detect the even-order harmonic voltage regulation signal and a fundamental wave signal generated based on the fundamental wave instruction of the external central control system (or may directly detect a signal obtained by superimposing the even-order harmonic voltage regulation signal and a fundamental wave signal), and generate the drive control signal based on the even-order harmonic voltage regulation signal, the fundamental wave signal, and the level-2 voltage instruction signal. It may be understood that the photovoltaic inverter may generate the drive control signal based on the even-order harmonic voltage regulation signal and the level-2 voltage instruction signal. Herein, when there is no current control unit in the photovoltaic inverter, the drive control unit may alternatively generate the drive control signal based on the even-order harmonic voltage regulation signal and the level-1 voltage instruction signal.

According to the implementations provided in this disclosure, not only the conversion circuit outputs the target voltage, but also the voltage at the neutral point of the conversion circuit remains stable. In this way, a structure is simple, and a control method is easy. In addition, the drive control unit may further generate the drive control signal based on the even-order harmonic voltage regulation signal and the level-2 voltage instruction signal. This is equivalent to injecting an even-order harmonic component to the drive control signal, to further maintain a neutral point balance of the conversion circuit. Therefore, control efficiency is high.

In this disclosure, the photovoltaic inverter can reduce the difference between the positive direct current bus voltage and the negative direct current bus voltage of the conversion circuit while controlling the conversion circuit to output the target voltage, to improve stability of the voltage at the neutral point of the conversion circuit. In this way, a structure is simple, a control method is easy, and applicability is high.

The foregoing descriptions are example implementations of the present disclosure, and are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A photovoltaic inverter comprising:
   a conversion circuit comprising:
   a positive direct current bus;
   a negative direct current bus;
   a switching transistor;
   a conversion circuit input configured to couple to a power supply through the positive direct current bus and the negative direct current bus; and
   a conversion circuit output configured to couple to a load;
   a collection circuit configured to obtain a positive direct current bus voltage of the conversion circuit and a negative direct current bus voltage of the conversion circuit; and
   a controller configured to:
   generate an even-order harmonic voltage regulation signal based on the positive direct current bus voltage, the negative direct current bus voltage, and a first phase of an output voltage of the photovoltaic inverter;
   generate a drive control signal based on the even-order harmonic voltage regulation signal; and
   control the switching transistor to be turned on or off to control the conversion circuit output to output a target voltage and reduce a difference between the positive direct current bus voltage and the negative direct current bus voltage.

2. The photovoltaic inverter of claim 1, wherein the conversion circuit further comprises:
   a neutral point;
   at least one switching bridge arm comprising switching transistors; and
   two groups of capacitors coupled in series with each other and coupled in parallel with the at least one switching bridge arm between the positive direct current bus and the negative direct current bus, wherein a series connection point of the two groups of capacitors is the neutral point, wherein the collection circuit comprises a collection circuit input coupled to the positive direct current bus, the negative direct current bus, and the neutral point, and wherein the collection circuit is further configured to obtain the positive direct current bus voltage and the negative direct current bus voltage based on a first potential of the positive direct current bus, a second potential of the negative direct current bus, and a third potential of the neutral point.

3. The photovoltaic inverter of claim 1, wherein the controller is further configured to:

generate an even-order harmonic amplitude signal based on the positive direct current bus voltage and the negative direct current bus voltage;

generate an even-order harmonic phase signal based on the first phase; and further generate the even-order harmonic voltage regulation signal based on the even-order harmonic amplitude signal and the even-order harmonic phase signal.

4. The photovoltaic inverter of claim 3, wherein the collection circuit is further configured to obtain the first phase and a second phase of an output current of the photovoltaic inverter, and wherein the controller is further configured to:

determine a type of the load based on the first phase and the second phase, wherein the type is at least one of an inductive load, a capacitive load, or a resistive load; and further generate the even-order harmonic phase signal based on the type.

5. The photovoltaic inverter of claim 4, wherein the controller comprises:

a signal generation circuit coupled to the collection circuit and configured to:

generate the even-order harmonic amplitude signal based on the positive direct current bus voltage and the negative direct current bus voltage;

generate the even-order harmonic phase signal based on the first phase; and generate the even-order harmonic voltage regulation signal based on the even-order harmonic amplitude signal and the even-order harmonic phase signal;

a voltage control circuit coupled to the signal generation circuit and configured to generate a voltage instruction signal of the conversion circuit based on the even-order harmonic voltage regulation signal; and a drive control circuit configured to:

couple the voltage control circuit to the conversion circuit;

generate the drive control signal based on the voltage instruction signal; and control the switching transistor to be turned on or off based on the drive control signal.

6. The photovoltaic inverter of claim 5, wherein the voltage control circuit is further configured to:

obtain a fundamental wave instruction of an external central control system; and superimpose the fundamental wave instruction and the even-order harmonic voltage regulation signal to obtain the voltage instruction signal of the conversion circuit.

7. The photovoltaic inverter of claim 6, wherein the controller further comprises:

a voltage feedback circuit coupled to the collection circuit and the voltage control circuit and configured to:

obtain the output voltage through the collection circuit; and set the output voltage as a voltage feedback signal, wherein the voltage control circuit is further configured to generate a level-1 voltage instruction signal based on the voltage feedback signal and the voltage instruction signal, and wherein the drive control circuit is further configured to generate the drive control signal based on the level-1 voltage instruction signal.

8. The photovoltaic inverter of claim 7, wherein the controller further comprises:

a current feedback circuit coupled to the collection circuit and configured to:

obtain the output current through the collection circuit; and set the output current as a current feedback signal; and a current control circuit coupled to the voltage control circuit, the drive control circuit, and the current feedback circuit and configured to generate a level-2 voltage instruction signal based on the level-1 voltage instruction signal and the current feedback signal, wherein the drive control circuit is further configured to generate the drive control signal based on the level-2 voltage instruction signal.

9. The photovoltaic inverter of claim 8, wherein the drive control circuit is further coupled to the signal generation unit; circuit and is further configured to:

obtain the even-order harmonic voltage regulation signal; and generate the drive control signal based on the even-order harmonic voltage regulation signal and the level-2 voltage instruction signal.

10. A photovoltaic inverter control method comprising:

detecting a positive direct current bus voltage of a conversion circuit of a photovoltaic inverter and a negative direct current bus voltage of the conversion circuit;

generating an even-order harmonic voltage regulation signal based on the positive direct current bus voltage, the negative direct current bus voltage, and a first phase of an output voltage of the photovoltaic inverter;

generating a drive control signal based on the even-order harmonic voltage regulation signal; and controlling a switching transistor in the conversion circuit to be turned on or off to control the conversion circuit to output a target voltage and reduce a difference between the positive direct current bus voltage and the negative direct current bus voltage.

11. The photovoltaic inverter control method of claim 10, wherein detecting the positive direct current bus voltage and the negative direct current bus voltage comprises: detecting the positive direct current bus voltage and the negative direct current bus voltage based on a first potential of the positive direct current bus, a second potential of the negative direct current bus, and a third potential of a neutral point of the conversion circuit.

12. The photovoltaic inverter control method of claim 10, wherein generating the even-order harmonic voltage regulation signal comprises:

generating an even-order harmonic amplitude signal based on the positive direct current bus voltage and the negative direct current bus voltage;

generating an even-order harmonic phase signal based on the first phase; and further generating the even-order harmonic voltage regulation signal based on the even-order harmonic amplitude signal and the even-order harmonic phase signal.

13. The photovoltaic inverter control method of claim 12, wherein generating the even-order harmonic phase signal comprises:

detecting the first phase and a second phase of an output current of the photovoltaic inverter;

determining a type of a load based on the first phase and the second phase, wherein the type is one or more of an inductive load, a capacitive load, or a resistive load; and further generating the even-order harmonic phase signal based on.

14. The photovoltaic inverter control method of claim 13, wherein generating the drive control signal comprises:

generating a voltage instruction signal of the conversion circuit based on the even-order harmonic voltage regulation signal; and further generating the drive control signal based on the voltage instruction signal.

15. The photovoltaic inverter control method of claim 14, wherein generating the voltage instruction signal comprises:

detecting a fundamental wave instruction of an external central control system; and superposing the fundamental wave instruction and the even-order harmonic voltage regulation signal to obtain the voltage instruction signal.

16. A power supply system comprising:

a power supply configured to supply power to a load; and a photovoltaic inverter comprising:

a conversion circuit comprising:

a positive direct current bus;

a negative direct current bus;

a switching transistor;

a conversion circuit input configured to couple to the power supply through the positive direct current bus and the negative direct current bus; and a conversion circuit output configured to couple to the load;

a collection circuit configured to obtain a positive direct current bus voltage of the conversion circuit and a negative direct current bus voltage of the conversion circuit; and a controller configured to:

generate an even-order harmonic voltage regulation signal based on the positive direct current bus voltage, the negative direct current bus voltage, and a first phase of an output voltage of the photovoltaic inverter;

generate a drive control signal based on the even-order harmonic voltage regulation signal; and control the switching transistor to be turned on or off to control the conversion circuit output to output a target voltage and reduce a difference between the positive direct current bus voltage and the negative direct current bus voltage.

17. The power supply system of claim 16, wherein the conversion circuit further comprises:

a neutral point;

at least one switching bridge arm comprising switching transistors; and two groups of capacitors coupled in series with each other and coupled in parallel with the at least one switching bridge arm between the positive direct current bus and the negative direct current bus, wherein a series connection point of the two groups of capacitors is the neutral point of the conversion circuit, wherein the collection circuit comprises a collection circuit input coupled to the positive direct current bus, the negative direct current bus, and the neutral point, and wherein the collection circuit is further configured to obtain the positive direct current bus voltage and the negative direct current bus voltage based on a first potential of the positive direct current bus, a second potential of the negative direct current bus, and a third potential of the neutral point.

18. The power supply system of claim 16, wherein the controller is further configured to:

generate an even-order harmonic amplitude signal based on the positive direct current bus voltage and the negative direct current bus voltage;

generate an even-order harmonic phase signal based on the first phase; and further generate the even-order harmonic voltage regulation signal based on the even-order harmonic amplitude signal and the even-order harmonic phase signal.

19. The power supply system of claim 18, wherein the collection circuit is further configured to obtain the first phase and a second phase of an output current of the photovoltaic inverter, and wherein the controller is further configured to:

determine a type of the load based on the first phase and the second phase, wherein the type is one or more of an inductive load, a capacitive load, or a resistive load; and further generate the even-order harmonic phase signal based on the type.

20. The power supply system of claim 19, wherein the controller comprises:

a signal generation circuit coupled to the collection circuit and configured to:

generate the even-order harmonic amplitude signal based on the positive direct current bus voltage and the negative direct current bus voltage;

generate the even-order harmonic phase signal based on the first phase; and generate the even-order harmonic voltage regulation signal based on the even-order harmonic amplitude signal and the even-order harmonic phase signal;

a voltage control circuit coupled to the signal generation circuit and configured to generate a voltage instruction signal of the conversion circuit based on the even-order harmonic voltage regulation signal; and a drive control circuit configured to:

couple the voltage control circuit to the conversion circuit;

generate the drive control signal based on the voltage instruction signal; and control the switching transistor to be turned on or off based on the drive control signal.

* * * * *